United States Patent [19]
Fujiyoshi

[11] Patent Number: 5,636,609
[45] Date of Patent: Jun. 10, 1997

[54] VARIABLE CYLINDER-OPERATION CONTROLLED INTERNAL COMBUSTION ENGINE

[75] Inventor: Yoshihiro Fujiyoshi, Saitama, Japan

[73] Assignee: Honda Giken Kogyo Kabushiki Kaisha, Tokyo, Japan

[21] Appl. No.: 475,881

[22] Filed: Jun. 7, 1995

[30] Foreign Application Priority Data

Sep. 20, 1994 [JP] Japan ................................ 6-224460

[51] Int. Cl.⁶ ................................................ F01L 1/34
[52] U.S. Cl. ................................... 123/198 F; 123/90.12
[58] Field of Search ........................ 123/198 F, 90.12, 123/90.16, 90.39, 90.17, 90.15

[56] References Cited

U.S. PATENT DOCUMENTS

| | | | |
|---|---|---|---|
| 4,146,006 | 3/1979 | Garabedian | 123/198 F |
| 4,545,342 | 10/1985 | Nakano et al. | 123/198 F |
| 4,584,974 | 4/1986 | Aoyama et al. | 123/198 F |
| 4,790,274 | 12/1988 | Inoue et al. | 123/198 F |
| 4,844,022 | 7/1989 | Konno | 123/198 F |
| 4,991,558 | 2/1991 | Daly et al. | 123/481 |
| 5,301,636 | 4/1994 | Nakamura | 123/198 F |
| 5,377,631 | 1/1995 | Schechter | 123/198 F |

FOREIGN PATENT DOCUMENTS

| | | |
|---|---|---|
| 0367448 | 5/1990 | European Pat. Off. . |
| 2601413 | 1/1988 | France . |
| 59-74343 | 4/1984 | Japan . |
| 59-103934 | 6/1984 | Japan . |
| 2078709 | 3/1990 | Japan . |

Primary Examiner—David A. Okonsky
Attorney, Agent, or Firm—Lyon & Lyon

[57] ABSTRACT

In a variable cylinder-operation controlled internal combustion engine in which the operation of one or more of the cylinders can be stopped, valve operation and stoppage switchover devices are provided in the cylinders, respectively, that are capable of independently switching the operation and stoppage of the engine valves in every cylinders. The operation of the valve operation and stoppage switchover device is controlled by a control unit, so that the operation and stoppage of the engine valves in all the cylinders are repeated according to previously established engine valve operation and stoppage modes when the engine is in a cylinder operation-stopped operational state. Thus, it is possible to prevent one or more of the cylinders from being brought into an incompletely warmed state for operation when the engine is restored to the all cylinder-operated state after continuation of the cylinder-stopped operation state over a long time.

14 Claims, 20 Drawing Sheets

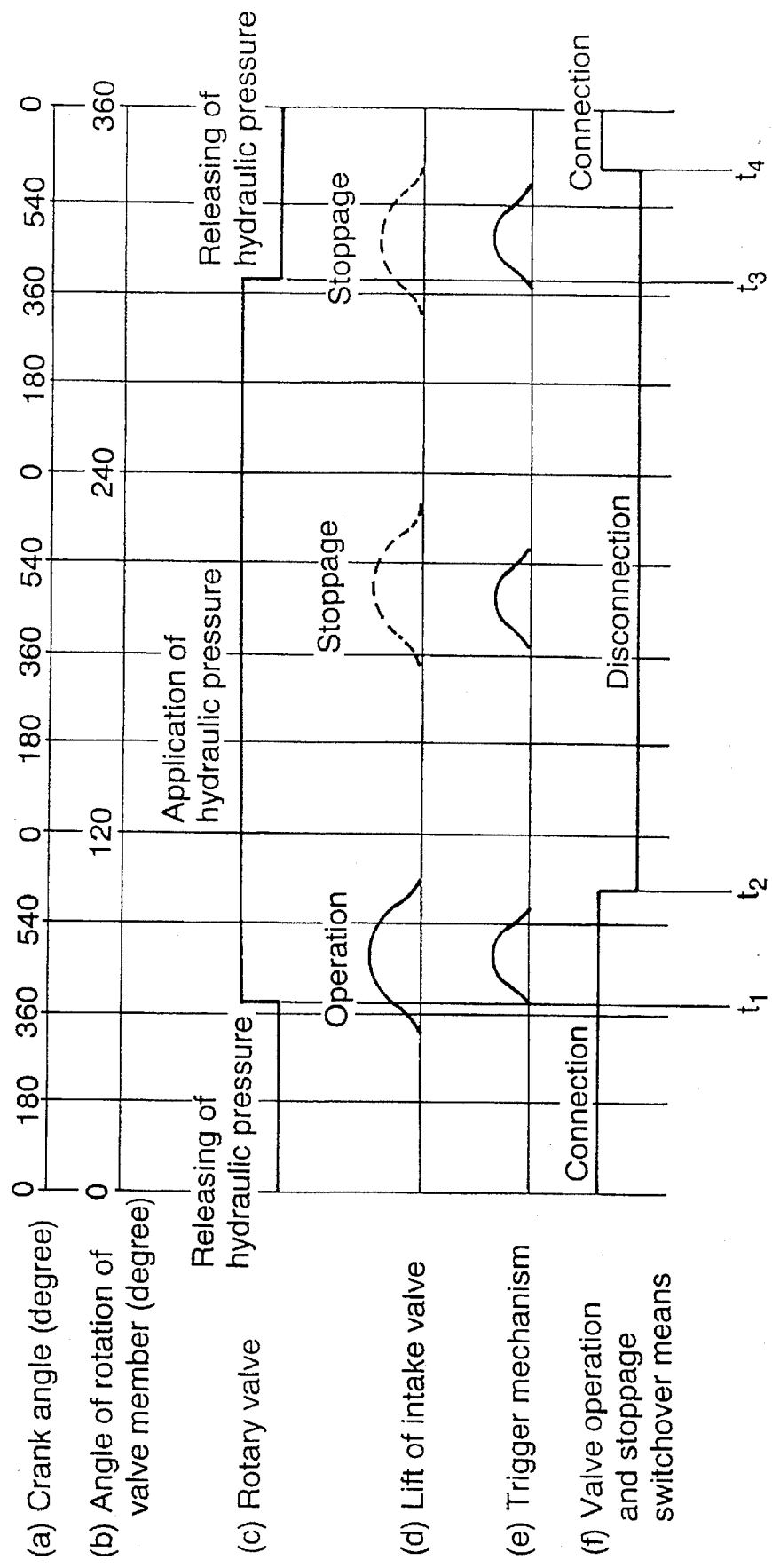

VARIABLE CYLINDER-OPERATION CONTROLLED INTERNAL COMBUSTION ENGINE

BACKGROUND OF THE INVENTION

1. Field of the Invention

The present invention relates to a cylinder number-controlled internal combustion engine in which the operation of one or more of the cylinders can be stopped.

2. Description of the Prior Art

Such internal combustion engines are conventionally known, for example, from Japanese Patent Application Laid-open No. 78709/90.

The above known internal combustion engine is of a construction such that only one or more predetermined particular cylinder(s) can be stopped. If the cylinder-stopped operation has been continued for a long time, the temperature of a peripheral portion within the stopped cylinder (e.g., the temperature of the cylinder wall surface, the top of a cylinder, the wall surface of the combustion chamber, the engine valve or the like) is dropped as compared with a normal fuel burning operation, and/or an unbalance of an oil rise and drop phenomenon in the stopped cylinder, a sticking of the engine valve, a compression leakage and the like may be produced. As a result, when the engine is restored to an all-cylinder-operated state, the engine is required to be operated in an incompletely warmed state in the cylinder which has been stopped theretofore, thereby causing an imbalance with the continuously operated cylinder(s) to bring about an increase in fuel consumption and a deterioration in the nature of the exhaust gas.

Thereupon, a control is also conducted such that the stopped cylinder is restored to an operative state after a lapse of a predetermined time from the start of the stoppage of the cylinder. With such a construction, however, the desired effect of providing a reduction in pumping loss and a reduction in fuel consumption, due to the stoppage of the cylinder, is not completely obtained, and it is necessary to detect that the above-described imbalance phenomenon is being produced due to an irregular switching of the operation and stoppage of the cylinder. Therefore, it is difficult to inhibit the generation of the imbalance.

SUMMARY OF THE INVENTION

Accordingly, it is an object of the present invention to provide a variable cylinder-operation controlled or cylinder number-controlled internal combustion engine wherein one or more of cylinders is prevented from being brought into an incompletely warmed state when the engine is restored to an all cylinder-operated state after continuation of the cylinder-stopped operation over a long time, thereby providing a reduction in pumping loss and a reduction in fuel consumption.

To achieve the above object, according to a first aspect and feature of the present invention, there is provided a variable cylinder-operation controlled internal combustion engine comprising engine valves disposed in a plurality of cylinders, respectively, such that an operation of one or more of the plurality of cylinders is stopped by stopping an operation of the engine valve disposed in such cylinder, wherein the internal combustion engine further includes valve operation and stoppage switchover means provided for the respective cylinders and capable of switching over the operation and stoppage of the engine valves independently from each other, and a control unit for controlling an operation of the valve operation and stoppage switchover means, such that the operation and stoppage of the engine valves in all the cylinders are repeated according to a previously established engine valve stoppage cycle, when the engine is in a cylinder operation-stopped operational state.

With the first feature of the present invention, the engine valves in the cylinders can be closed and stopped periodically and in different orders, thus preventing one or more of the cylinders from being brought into an incompletely warmed state when the engine is restored to the all cylinder-operated state after continuation of the cylinder-stopped operation over a long time, and providing a reduction in pumping loss and a reduction in fuel consumption by stoppage of the cylinder as a result of stoppage of the operation of the engine valve.

According to a second aspect and feature of the present invention, in addition to the first feature, a plurality of control modes with different engine valve stoppage cycles are established, and the control unit is capable of selecting any of the control modes in accordance with the operational state of the engine.

With the second feature of the present invention, it is possible to select the cylinder stoppage suitable to the operational state of the engine.

According to a third aspect and feature of the present invention, in addition to the first or second feature, the engine valve stoppage cycle is established so as to include a stoppage cycle in which a frequency of stoppage of the engine valve for every set number of rotations of a crankshaft is differentiated between the plurality of cylinders.

With the third feature of the present invention, it is possible to widen the range of engine valve stoppage cycle established, thereby providing the subdivision and widening of the cylinder stoppage control.

According to a fourth aspect and feature of the present invention, in addition to the second feature, a plurality of control modes are established such that engine valve stoppage cycles for the cylinders are different from one another, and frequencies of stoppage of the engine valves in the cylinders for every set number of rotations of a crankshaft are made uniform between the cylinders, and the control unit is capable of selecting any of the control modes in accordance with the operational state of the engine.

With the fourth feature of the present invention, it is possible to more reliably eliminate an imbalance between the cylinders when the engine is restored to the all cylinder-operated state after continuation of the cylinder-stopped operation over a long time.

According to a fifth aspect and feature of the present invention, in addition to the first feature, the engine valve stoppage cycle is set for each of the cylinders and is established such that phases of the engine valve stoppage cycles for at least two of the cylinders are different from each other.

With the fifth feature of the present invention, it is possible to smooth the operation of the engine during stoppage of the cylinders.

According to a sixth aspect and feature of the present invention, in addition to the first, second, third or fourth feature, the valve operation and stoppage switchover means for each of the cylinders is arranged such that the operation and stoppage of the engine valve is switched by a fluid pressure, and the engine further includes solenoid fluid pressure control valve means which are independently connected to the valve operation and stoppage switchover means for the cylinders, respectively, and controlled by the control unit.

With the sixth feature of the present invention, it is possible to precisely control the closing and stoppage cycle of the engine valve in each of the cylinders by the independent control by each of the solenoid fluid pressure control valve means.

According to a seventh aspect and feature of the present invention, in addition to the first, second, third or fourth feature, the valve operation and stoppage switchover means for each of the cylinders is arranged such that the operation and stoppage of the engine valve is switched by a fluid pressure, and wherein the engine further includes a solenoid fluid pressure control valve means disposed for each of separate groups of the cylinders and controlled by the control means, and a mechanically-operated valve which is provided between each of the solenoid fluid pressure control valve means and each of the valve operation and stoppage switchover means for determining a timing of supply of working fluid to each of the valve operation and stoppage switchover means by a mechanical operation related to the rotating operation of the crankshaft.

With the seventh feature of the present invention, it is possible to reduce the number of the relatively expensive fluid pressure control valve means and to carry out the switching of the operation and stoppage of the engine valve by the mechanical operation operatively associated to the crankshaft rotation.

Further, according to an eighth aspect and feature of the present invention, there is provided a variable cylinder-operation controlled internal combustion engine comprising combustion governing means disposed for each of a plurality of cylinders to govern execution and stoppage of fuel combustion, such that an operation of one or more of the cylinders is stopped by a stopping operation of the combustion governing means, wherein the internal combustion engine further includes a control unit for controlling a switchover between the operation and stoppage of the combustion governing means for each of the cylinders such that the operation and stoppage of all the cylinders are repeated according to a previously established cylinder stoppage cycle, when the engine is in a cylinder-operation-stopped operational state, the control unit being capable of selecting any of a plurality of control modes each having a different cylinder stoppage cycle in accordance with the operational state of the engine.

With the eighth feature of the present invention, the cylinders can be stopped, thus preventing one or more of the cylinders from being brought into an incompletely warmed state for operation when the engine is restored to the all cylinder-operated state after continuation of the cylinder-stopped operation over a long time, and moreover to select the cylinder stoppage suitable to the operational state of the engine.

The above and other objects, features and advantages of the invention will become apparent from preferred embodiments taken in conjunction with the accompanying drawings.

BRIEF DESCRIPTION OF THE DRAWINGS

FIG. 14 is a stoppage timing chart for the intake valve for this second embodiment;

DESCRIPTION OF THE PREFERRED EMBODIMENTS

The present invention will now be described by way of preferred embodiments taken in connection with the accompanying drawings.

A first embodiment of the present invention will be first described with reference to FIGS. 1 to 10.

Figure 1:
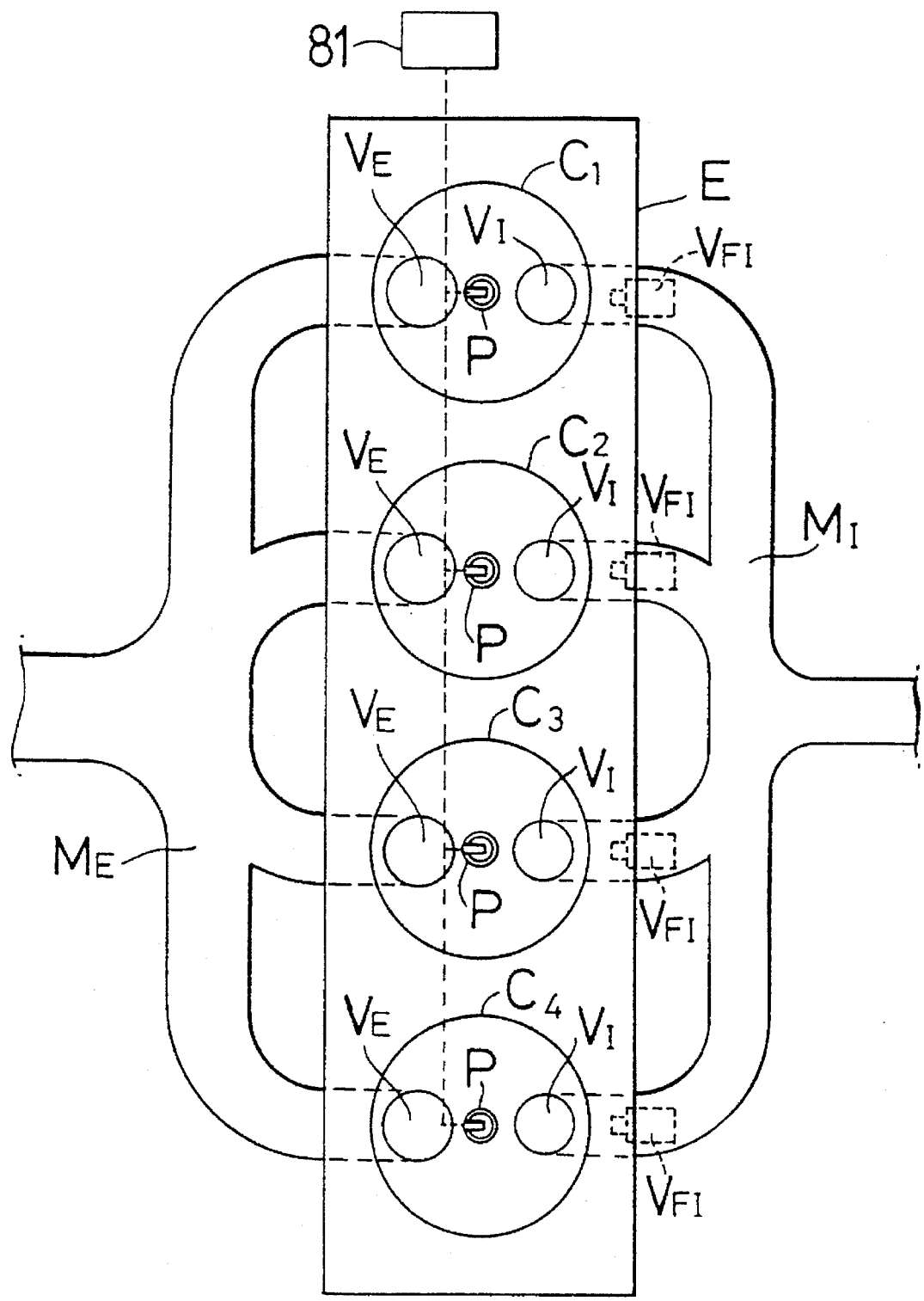
FIG. 1 is a simplified plan view of a 4-cylinder internal combustion engine according to a first embodiment of the present invention.
Figure 2:
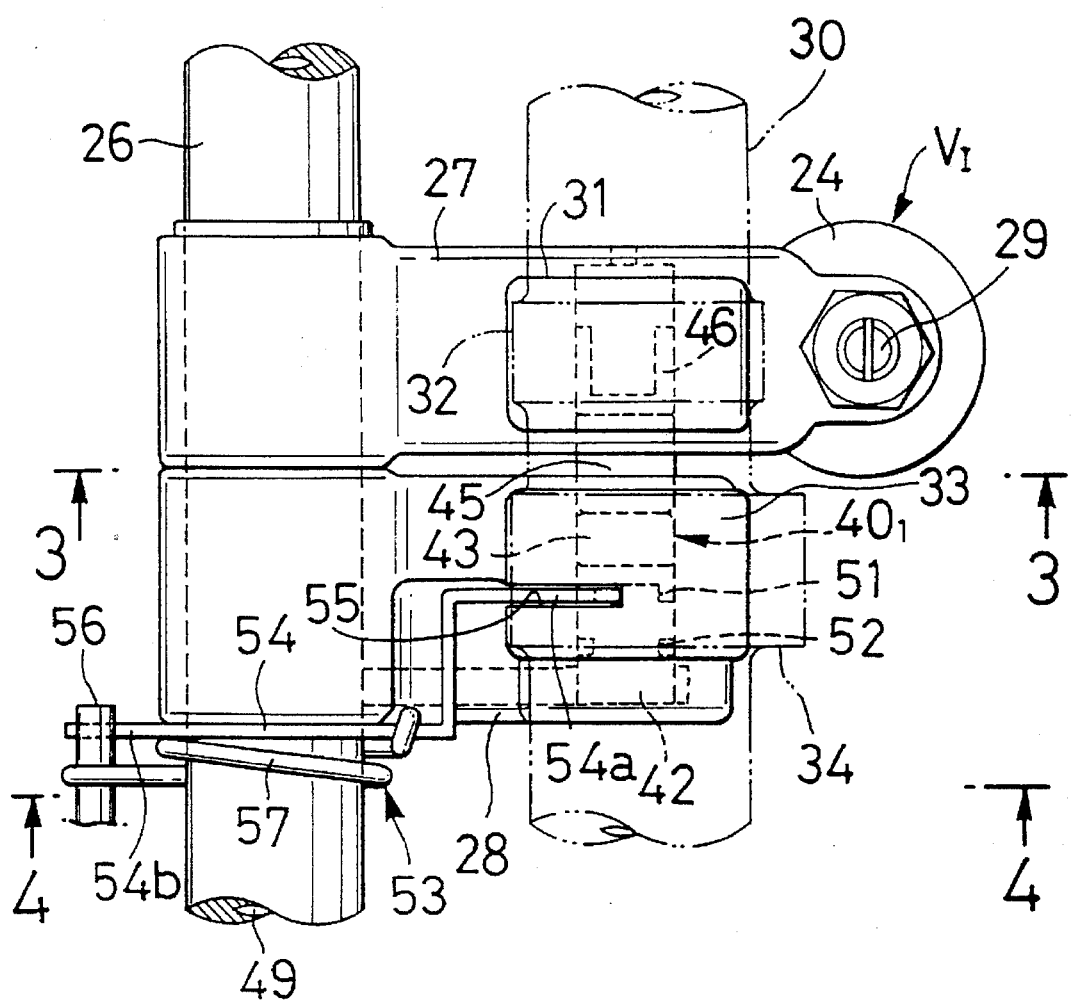
FIG. 2 is a plan view of a valve operating device for an intake valve.
Figure 3:
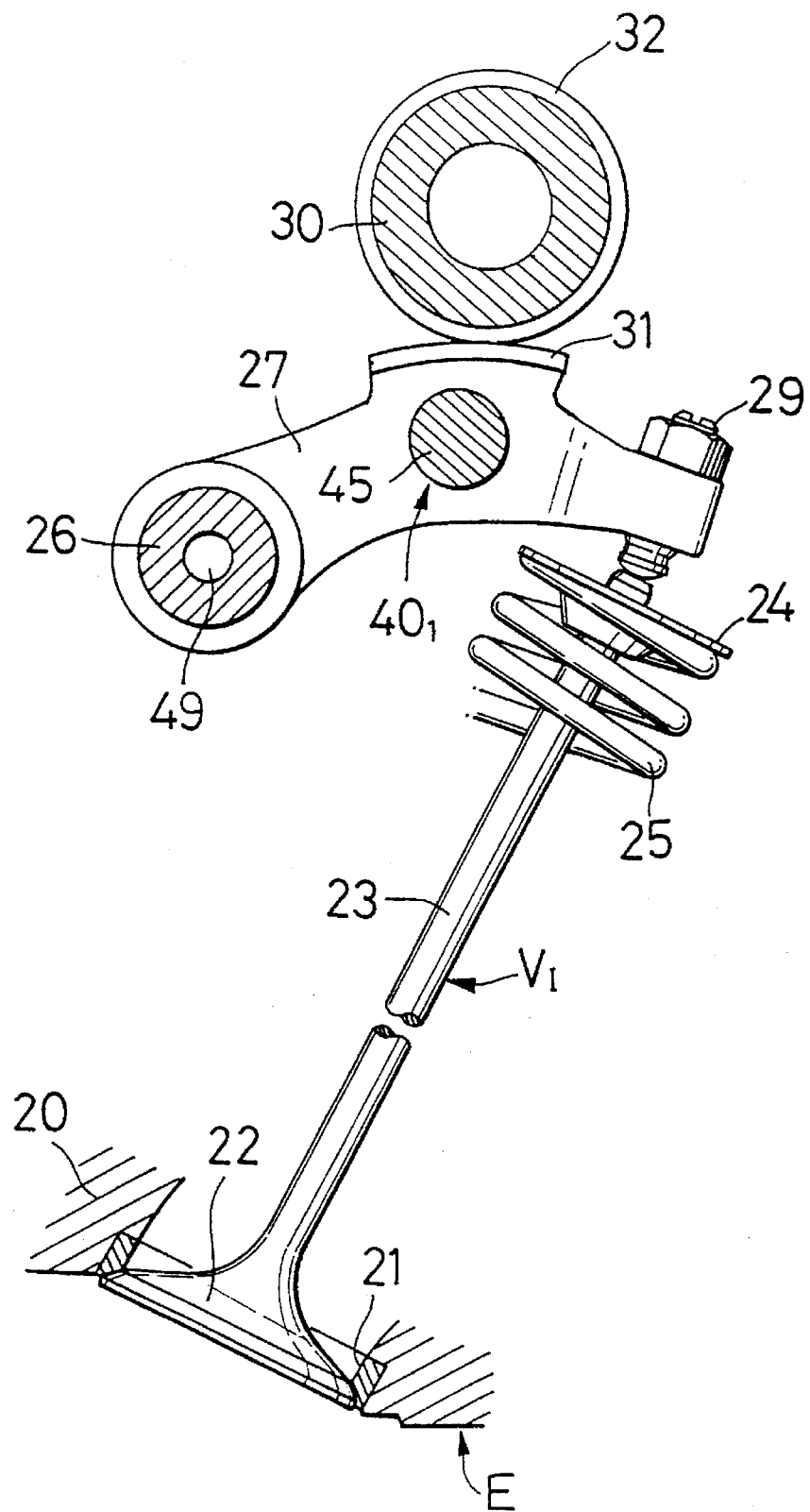
FIG. 3 is a sectional view taken along a line 3—3 in FIG. 2.
Figure 4:
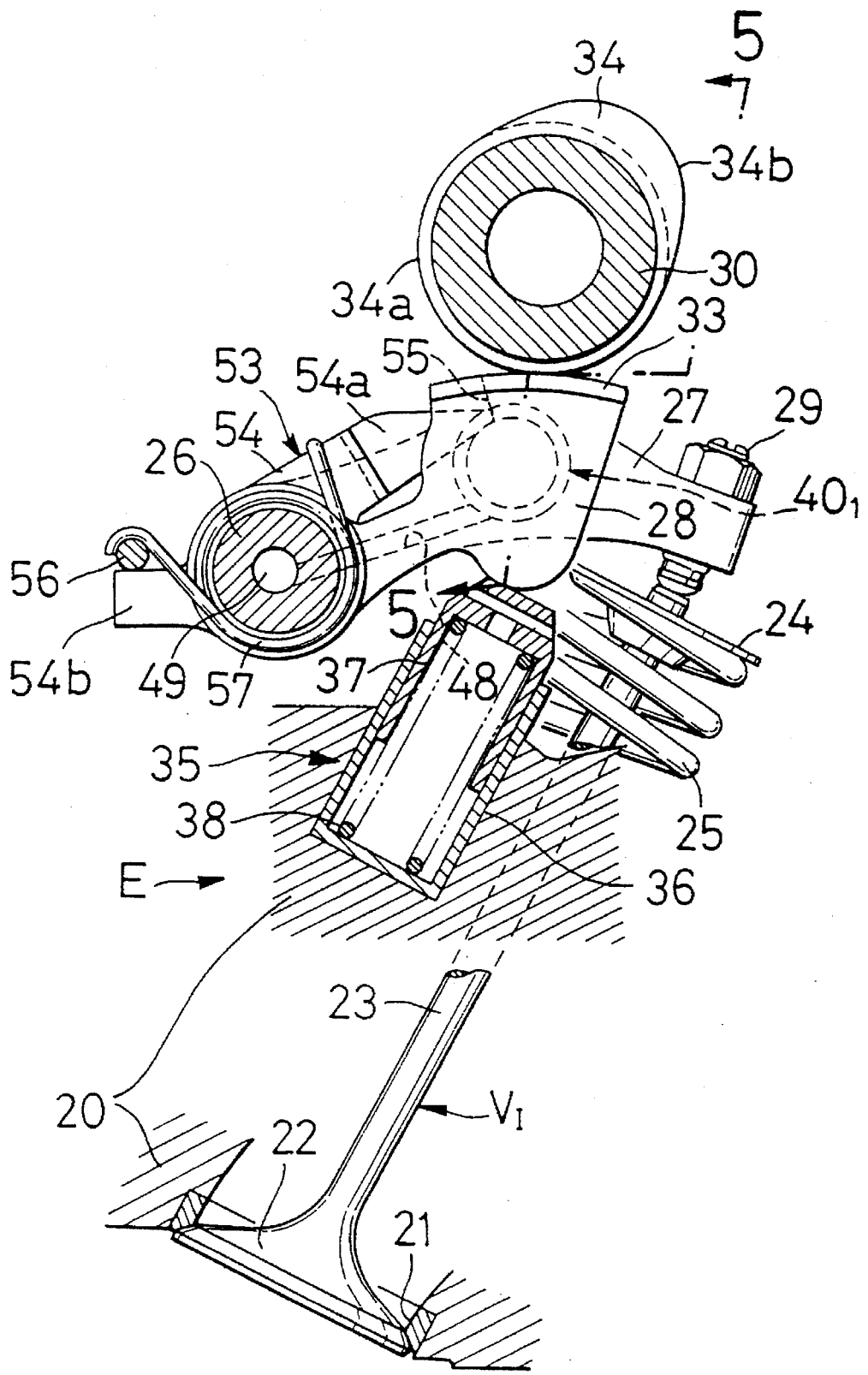
FIG. 4 is a sectional view taken along a line 4—4 in FIG. 2.

Referring first to FIG. 1, a multi-cylinder internal combustion engine is, for example, a four-cylinder internal combustion engine including first, second, third and fourth cylinders $C_1$, $C_2$, $C_3$ and $C_4$ mounted in parallel in an engine body E. Each of the cylinders $C_1$, $C_2$, $C_3$ and $C_4$ has an intake valve $V_I$ disposed therein as an engine valve for controlling the timing of supply of an air-fuel mixture from an intake manifold $M_I$ into each of the cylinders $C_1$, $C_2$, $C_3$ and $C_4$, and an exhaust valve $V_E$ disposed therein as an engine valve for controlling the timing of discharge of an exhaust gas from each of the cylinders $C_1$, $C_2$, $C_3$ and $C_4$ into an exhaust manifold $M_E$. A fuel injection valve $V_{FI}$ corresponding to each of the cylinders $C_1$, $C_2$, $C_3$ and $C_4$ is disposed in the intake manifold $M_I$, and a spark plug P is disposed in each of the cylinders $C_1$, $C_2$, $C_3$ and $C_4$ and ignited by an igniter 81.

Referring to FIGS. 2 to 5, the intake valve $V_I$ in the first cylinder $C_1$ includes an umbrella-like valve member 22 integrally provided on a valve stem 23 and capable of opening and closing an intake valve bore 21 provided in a cylinder head 20 in the engine body E. The intake valve $V_I$ is carried in the cylinder head 20 for movement in opening and closing directions, i.e., in a longitudinal direction of the valve stem 23. A valve spring 25 is compressed between a retainer 24 mounted at an upper end of the valve stem 23 and the cylinder head 20, and the intake valve $V_I$ is biased in a direction to close the intake valve bore 21 by the valve member 22, i.e., in the valve closing direction.

A rocker arm shaft 26 is fixed and positioned above the cylinder head 20 to extend in the direction of arrangement of the cylinders $C_1$ to $C_4$. A base end of a driving rocker arm 27 and a base end of a free rocker arm 28 adjacent the driving rocker arm 27 are swingably carried adjacent to each other on the rocker arm shaft 26. A tappet screw 29 is threadedly inserted through a tip end of the driving rocker arm 27 to abut against an upper end of the valve stem 23 of the intake valve $V_I$, so that the advanced and retreated positions of the tappet screw 29 can be adjusted.

A camshaft 30 operatively connected to a crankshaft (not shown) at a reduction ratio of ½ is rotatably disposed above the rocker arms 27 and 28 and has an axis parallel to the rocker arm shaft 26. The cam shaft 30 includes a valve stopping or rest portion 32 which is integrally provided thereon to come into sliding contact with a slipper 31 mounted on an upper surface of the driving rocker arm 27, and an operating cam 34 which is also integrally provided thereon to come into sliding contact with a cam slipper 33 mounted on an upper surface of the free rocker arm 28.

The valve rest portion 32 is raised from an outer surface of the cam shaft 30 into a circular shape spaced at an equal distance (radius) from the axis of the cam shaft 30. The operating cam 34 includes a base-circle portion 34a spaced apart at a distance (radius) from the axis of the cam shaft 30, which is equal to the outside radius of the rest portion 32, and a cam lobe 34b projecting radially outwardly from the base-circle portion 34a.

The driving rocker arm 27 is biased toward the rest portion 32 by the valve spring 25, while the free rocker arm 28 is biased toward the operating cam 34 by a lost motion mechanism 35 provided between the free rocker arm 28 itself and the cylinder head 20. The lost motion mechanism 35 includes a bottomed guide sleeve 36 fixedly mounted in the cylinder head 20, a bottomed cylindrical lifter 37 slidably received in the guide sleeve 36, and a spring 38 compressed between the guide sleeve 36 and the lifter 37. The free rocker arm 28 is biased normally into sliding contact with the operating cam 34 by abutment of the lifter 37 biased upwardly by the spring 38 against a lower surface of the free rocker arm 28.

A valve operation and stoppage switchover means $40_1$ is provided between the driving rocker arm 27 and the free rocker arm 28 and is capable of connecting and disconnecting the rocker arms 27 and 28 to and from each other, i.e., switchable by a hydraulic pressure as a fluid pressure between a state in which it connects the rocker arms 27 and 28 to each other to open and close the intake valve $V_I$ by the operating cam 34, and a state in which it disconnects the rocker arms 27 and 28 from each other to stop the intake valve $V_I$ by the circular rest portion 32.

The valve operation and stoppage switchover means $40_1$ includes a first piston 42 slidably received in the free rocker arm 28 and having one end facing a hydraulic pressure chamber 41, a second piston 43 slidably received in the free rocker arm 28 and having one end opposed to the other end of the first piston 42, a spring 44 compressed between the first and second pistons 42 and 43, a switchover pin 45 having one end abutting against the other end of the second piston 43, a limiting member 46 slidably received in the driving rocker arm 27 and having one end abutting against the other end of the switchover pin 45, and a return spring 47 compressed between the limiting member 46 and the driving rocker arm 27. The return spring 47 has a preset load which is set larger than the preset load of the spring 44.

The first piston 42 is formed into a bottomed cylindrical shape with one end closed, and the hydraulic pressure chamber 41 is defined between the one end of the first piston 42 and the free rocker arm 28. A communication passage 48 is provided in the free rocker arm 28 to lead to the hydraulic pressure chamber 41 and is normally in communication with an oil passage 49 which is coaxially provided within the rocker arm shaft 26. The second piston 43 is formed into a relatively short columnar shape.

Figure 5:
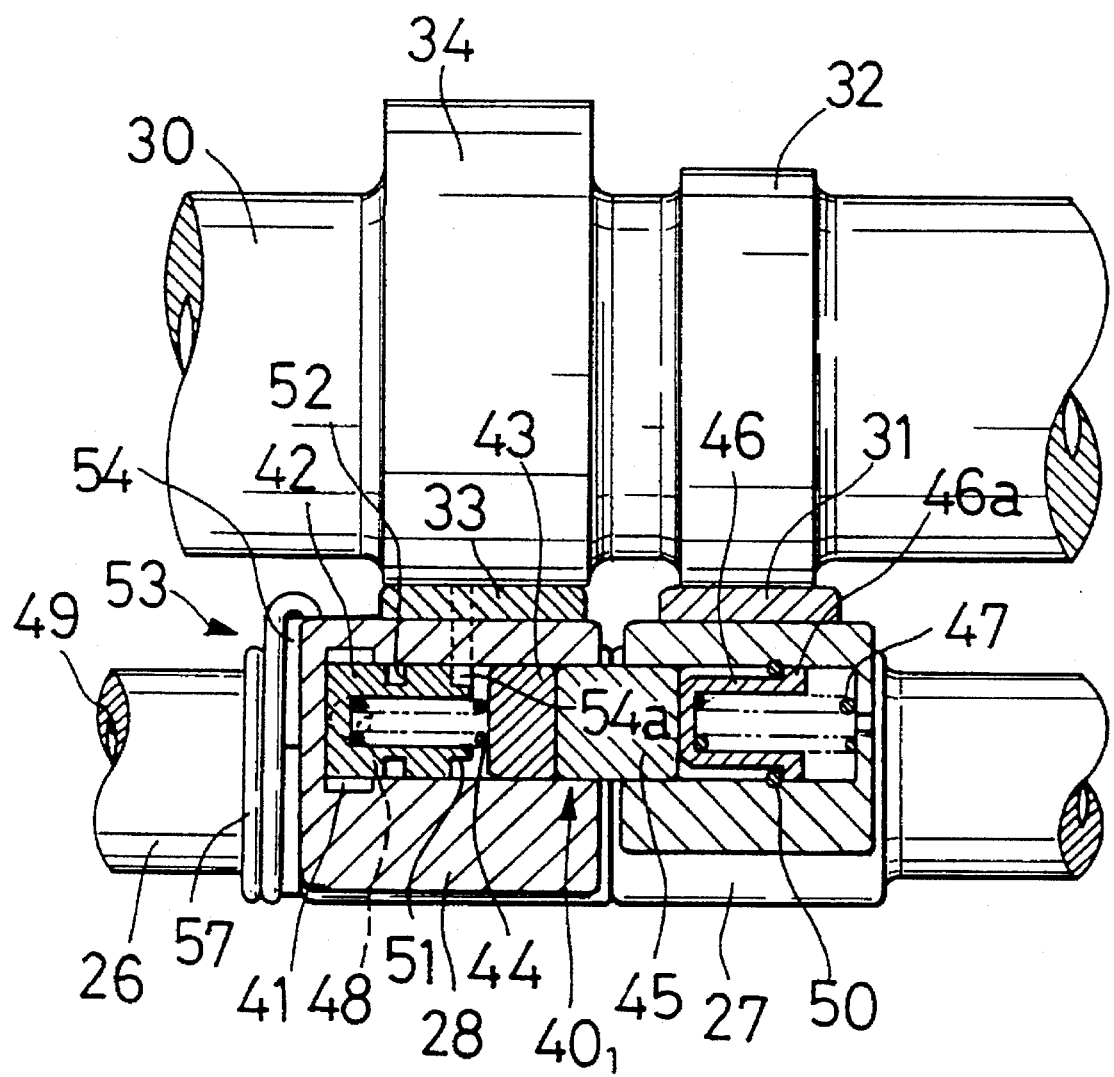
FIG. 5 is a sectional view taken along a line 5—5 in FIG. 4.
Figure 6:
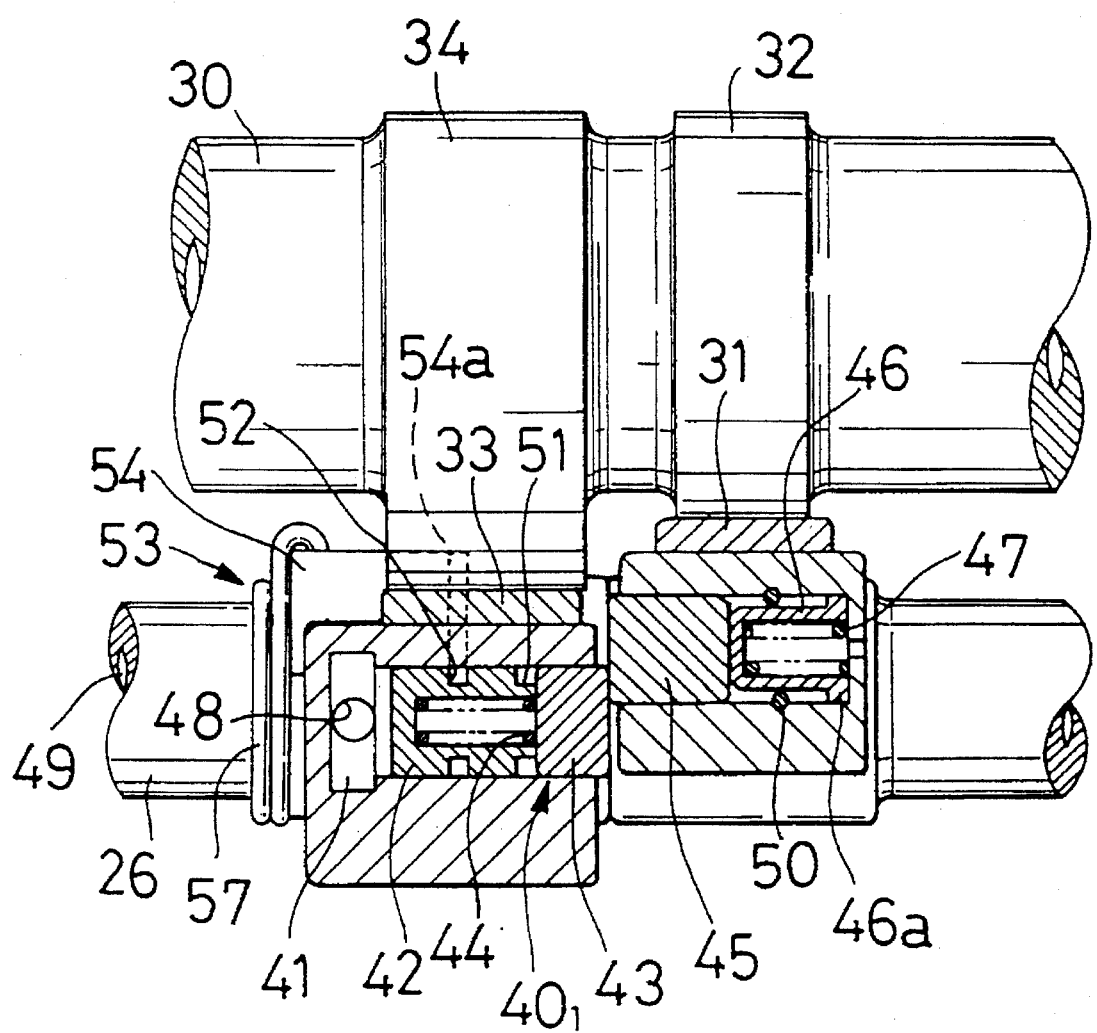
FIG. 6 is a sectional view similar to FIG. 5, but in a valve-stopped state.

The switchover pin 45 is slidable between a position in which it is fitted astride a boundary between the free rocker arm 28 and the driving rocker arm 27, as shown in FIG. 5, and a position in which it is fitted in the driving rocker arm 27, so that its surface abutting against the second piston 43 is located at a position corresponding to the boundary between the driving rocker arm 27 and the free rocker arm 28, as shown in FIG. 6. The switchover pin 45 is formed into a short columnar shape.

The limiting member 46 is formed into a bottomed cylindrical shape with one closed end abutting against the switchover pin 45, and has a collar portion 46a which is provided at the other end thereof to protrude radially outwardly and which is slidably received in the driving rocker arm 27. A retaining ring 50 is fitted in the driving rocker arm 27 and abuts against the collar portion 46a of the limiting member 46 to limit the movement of the limiting member 46 toward the one end of the limiting member, i.e., toward the switchover pin 45.

The axial lengths of the switchover pin 45 and the limiting member 46 are set so that when the limiting member 46 has been moved to a position in which its movement is limited by the retaining ring 50, as shown in FIG. 5, the switchover pin 45 abutting against the limiting member 46 is located astride the boundary between the driving rocker arm 27 and the free rocker arm 28 to connect the rocker arms 27 and 28 to each other, and when the limiting member 46 has been moved, while compressing the return spring 47, to a position to abut against the driving rocker arm 27, as shown in FIG. 6, the surface of the switchover pin 45 abutting against the second piston 43 is located at the position corresponding to the boundary between the rocker arms 27 and 28. On the other hand, in a condition in which a portion of the switchover pin 45 is within the free rocker arm 28, as shown in FIG. 5, the first and second pistons 42 and 43 are slidably fitted in the free rocker arm 28, so that they can be moved away from each other by a spring force of the spring 44.

An annular engage recess 51 is provided in an outer surface of the first piston 42 at its end adjacent the second piston 43, and an annular engage groove 52 is provided in an outer periphery of the first piston 42.

A trigger mechanism 53 is associated with such valve operation and stoppage switchover means $40_1$ for limiting the timing of operation of the valve operation and stoppage switchover means $40_1$. The trigger mechanism 53 includes a trigger plate 54 which is swingable relative to the rocker arms 27 and 28 about the axis of the rocker arm shaft 26 between a position in which it is in engagement with the engage recess 51 or the engage groove 52 in the first piston 42 to limit the movement of the first piston 42, and a position in which it is out of engagement with the engage recess 51 or the engage groove 52 in the first piston 42 to permit the movement of the first piston 42.

A slit 55 is provided in the free rocker arm 28, so that its position corresponds to the engage recess 51 in a condition in which the first piston 42 has been moved to the maximum toward the hydraulic pressure chamber 41, as shown in FIG. 5. The engage groove 52 is provided in the outer periphery of the first piston 42, so that it is located at a position corresponding to the slit in a condition in which the first and second pistons 42 and 43 abutting against each other as shown in FIG. 6 have been moved to the maximum to a position in which the volume of the hydraulic pressure chamber 41 is maximized.

The trigger plate 54 is rotatably carried on the rocker arm shaft 26. The trigger plate 54 has an engage plate portion 54a integrally provided thereon and capable of being disengageably engaged into the engage recess 51 or the engage groove 52 from the slit 55.

A stopper pin 56 is fixedly mounted in the engine body E to extend toward the free rocker arm 28, and a stopper 54b is provided to protrude from the trigger plate 54 and capable of abutting against the stopper pin 56 from below. A torsion spring 57 is locked at its one end to the stopper pin 56 to surround the rocker arm shaft 26 and at the other end thereof to the trigger plate 54 from above. The trigger plate 54 is biased in a direction to cause the stopper 54b to abut against the stopper pin 56 by the torsion spring 57. The position of the stopper pin 56 is established so that when the free rocker arm 28 is in a stationary state to abut against the base-circle portion 34a of the operating cam 34 in a condition in which the stopper 54b is in abutment against the stopper pin 56, the engage plate portion 54a of the trigger plate 54 is capable of being engaged into the engage recess 51 or the engage groove 52 from the slit 55, and when the free rocker arm 28 is swung in the valve opening direction by the cam lobe 34b of the operating cam 34, the engage plate portion 54a is disengaged from the slit 55.

With such valve operation and stoppage switchover means $40_1$, in a condition in which the hydraulic pressure in the hydraulic pressure chamber 41 has been released, the switchover pin 45 is positioned astride the boundary between the driving rocker arm 27 and the free rocker arm 28 under the influence of the spring force of the return spring 47, as shown in FIG. 5, to connect the rocker arms 27 and 28 to each other. In this condition, the driving rocker arm 27 connected to the intake valve $V_I$ is swung along with the free rocker arm 28 driven by the operating cam 34, and the intake valve $V_I$ is opened and closed with a characteristic corresponding to the profile of the operating cam 34.

During this time, when the free rocker arm 28 has been pushed down by the cam lobe 34b of the operating cam 34, the engage plate portion 54a of the trigger plate 54 in the trigger mechanism 53 is disengaged from the engage recess 51, and when the free rocker arm 28 is in the stationary state in which it is in sliding contact with the base-circle portion 34a of the operating cam 34, the engage plate portion 54a is engaged into the engage recess 51.

Then, if a hydraulic pressure is applied to the hydraulic pressure chamber 41, when the engage plate portion 54a has been disengaged from the engage recess 51, i.e., during opening operation of the intake valve $V_I$, the first piston 42 is moved while compressing the spring 44, until it abuts against the second piston 43, but the switchover pin 45 is in the state in which it is located astride the boundary between the driving rocker arm 27 and the free rocker arm 28 to connect the rocker arms 27 and 28 to each other, so that a force in a shearing direction is applied to the switchover pin 45 and hence, the first piston 42 is inhibited from being moved until it pushes the switchover pin 45 into the driving rocker arm 27 through the second piston 43. However, when the free rocker arm 28 starts to slide on the base-circle portion 34a of the operating cam 34 to cause a decrease in the force in the shearing direction on the switchover pin 45, the first piston 42 operates the switchover pin 45 through the second piston 43, until the switchover pin 45 is pushed into the driving rocker arm 27, as shown in FIG. 6, thereby releasing the connection of the rocker arms 27 and 28 to each other. Thus, the intake valve $V_I$ is brought into the closed and stopped state, because the driving rocker arm 27 connected to the intake valve $V_I$ is left stopped or at rest by the valve stopping or rest portion 32.

In a condition in which the connection of the rocker arm 27 and 28 to each other has been released in this manner, when the free rocker arm 28 is pushed down by the cam lobe 34b of the operating cam 34, the engage plate portion 54a of the trigger plate 54 in the trigger mechanism 53 is disengaged from the engage groove 52, and when the free rocker arm 28 is in the stationary state in which it is in sliding contact with the base-circle portion 34a of the operating cam 34, the engage plate 54a is engaged into the engage groove 52. When the hydraulic pressure in the hydraulic pressure chamber 41 is released to bring the rocker arms 27 and 28 into their interconnected states, the first piston 42 is moved by the spring force of the spring 44 to a position to minimize the volume of the hydraulic pressure chamber 41 in response to the free rocker arm 28 being pushed down to disengage the engage plate portion 54a from the engage groove 52. Then, when the free rocker arm 28 starts to come into sliding contact with the base-circle portion 34a of the operating cam 34, thereby causing the axes of the switchover pin 45 and the second piston 43 to be aligned with each other, the switchover pin 45 is moved to a position astride the boundary between the rocker arms 27 and 28 by the spring force of the return spring 47 to connect the rocker arms 27 and 28 to each other.

The exhaust valve $V_E$ in the first cylinder $C_1$ is connected to a valve operating device having a construction similar to that of the above-described intake valve $V_I$ and commonly including the cam shaft 30. During operation of the intake valve $V_I$, the exhaust valve $V_E$ is also opened and closed. When the intake valve $V_I$ is stopped, the exhaust valve is also stopped.

Figure 7:
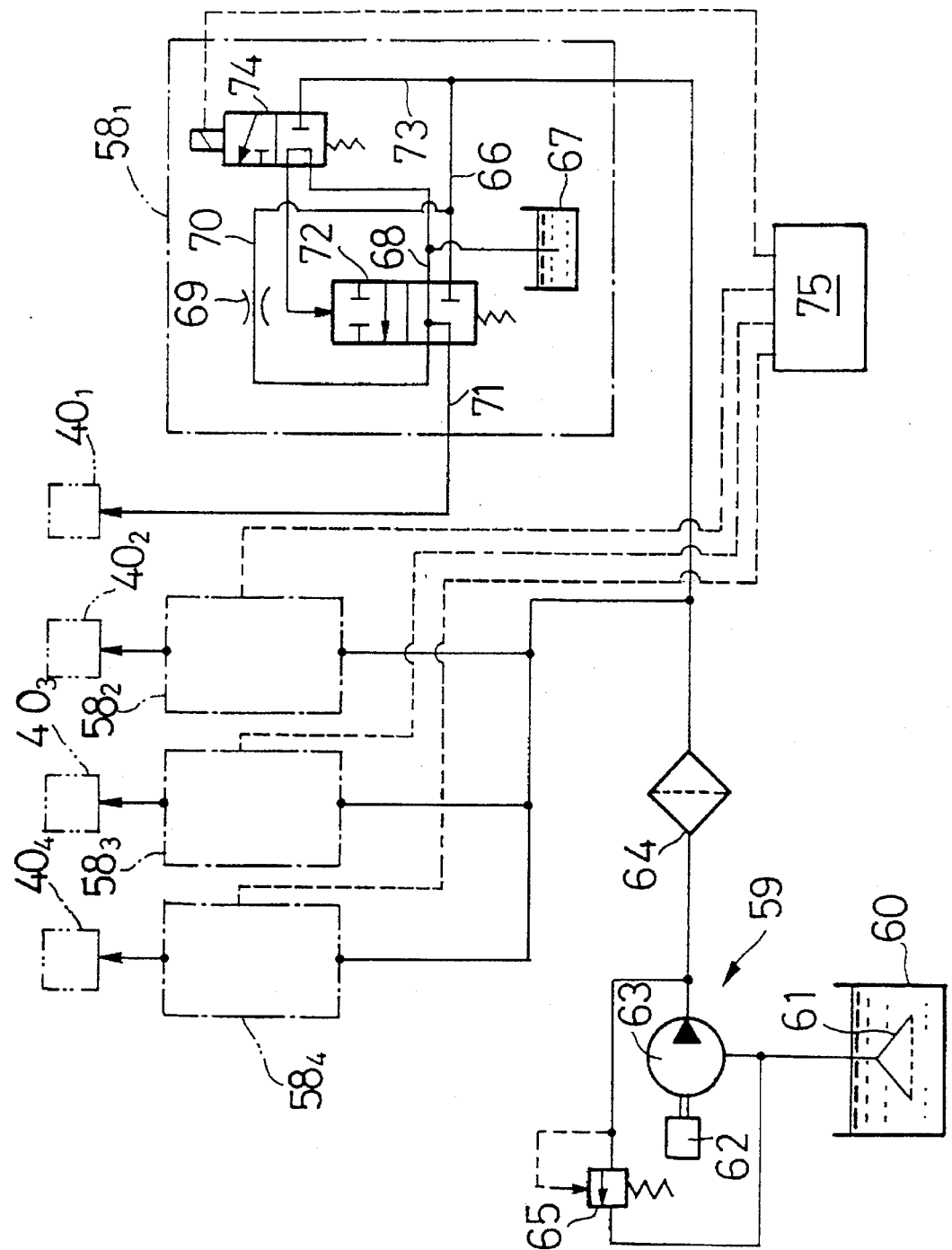
FIG. 7 is a diagram illustrating a hydraulic pressure circuit connected to valve operation and stoppage switchover means.

Referring to FIG. 7, the intake valves $V_I$ and the exhaust valves $V_E$ in the second, third and fourth cylinders $C_2$, $C_3$ and $C_4$ are opened and closed by valve operating devices each having a construction similar to that in the first cylinder $C_1$. Valve operation and stoppage switchover means $40_2$, $40_3$ and $40_4$ each having a construction similar to that of the valve operation and stoppage switchover means $40_1$ for the first cylinder $C_1$ are also independently provided in the valve operating devices for the second, third and fourth cylinders $C_2$, $C_3$ and $C_4$. Therefore, oil passages 49 leading to the hydraulic pressure chambers 41 in the valve operation and stoppage switchover means $40_1$, $40_2$, $40_3$ and $40_4$ are provided in the rocker arm shaft 26 independently for every cylinder $C_1$, $C_2$, $C_3$ and $C_4$.

The valve operation and stoppage switchover means $40_1$, $40_2$, $40_3$ and $40_4$ for the cylinders $C_1$, $C_2$, $C_3$ and $C_4$ are connected to a common hydraulic pressure source 59 through separate solenoid fluid pressure control valve means $58_1$, $58_2$, $58_3$ and $58_4$, respectively.

The hydraulic pressure source 59 includes a reservoir 60 for storing a working oil therein, a pump 63 driven by a crankshaft 62 of the engine and having a drawing port connected to the reservoir 60 through a filter 61, a filter 64 connected to a discharge port of the pump 63, and a relief valve 65 interposed between the discharge port and the reservoir 60. During operation of the engine, a substantially constant hydraulic pressure is delivered from the hydraulic pressure source 59 via filter 64.

The solenoid fluid pressure control valve $58_1$ includes a switchover control valve 72 interposed between a supplying oil passage 66 leading to the hydraulic pressure source 59 as well as a releasing oil passage 68 leading to a reservoir 67 and an oil passage 70 connected to the supplying oil passage 66 and having a constriction 69 incorporated therein as well as an oil passage 71 connected to the oil passage 49 in the valve operation and stoppage switchover means $40_1$, and a solenoid switchover valve 74 incorporated in a pilot passage 73 connected to the supplying oil passage 66. The reservoir 67 may be identical with the reservoir 60 of the hydraulic pressure source 59.

The switchover control valve 72 is operated for switchover in response to a pilot hydraulic pressure from the pilot oil passage 73 and switchable between a state in which it permits the oil passages 70 and 71 to communicate with the releasing oil passage 68 in a condition in which the pilot hydraulic pressure from the pilot oil passage 73 is not applied, i.e., a state in which it releases the hydraulic pressure in the hydraulic pressure chamber 41 in the valve operation/stoppage switchover means $40_1$ to open and close the intake valve $V_I$ and the exhaust valve $V_E$, and a state in which it permits the oil passage 71 to communicate with the supplying oil passage 66 and cuts off the communication of the oil passage 70 with the releasing oil passage 68 in a condition in which the pilot hydraulic pressure from the pilot oil passage 73 has been applied, i.e., in a state in which it permits the hydraulic pressure to be applied to the hydraulic pressure chamber 41 in the valve operation/stoppage switchover means 401 to close and stop the intake valve $V_I$ and the exhaust valve $V_E$.

The solenoid switchover valve 74 is switchable between a state in which it cuts off the communication of the pilot passage 73 and permits a portion of the pilot oil passage 73 downstream of the solenoid switchover valve 74 to communicate with the reservoir 67 by deenergization thereof, and a state in which it permits the communication of the pilot oil passage 73 through the valve 74 by energization thereof.

More specifically, in the solenoid fluid pressure control valve means $58_1$, when the solenoid switchover valve 74 is in the deenergized state, the switchover control valve 72 is in a state in which it releases the hydraulic pressure in the hydraulic pressure chamber 41 in the valve operation/stoppage switchover means $40_1$ for connecting the rocker arm 27 and 28 to open and close the intake valve $V_I$ and the exhaust valve $V_E$, and when the solenoid switchover valve 74 is in the energized state, the switchover control valve 72 is in a state in which it applies the hydraulic pressure to the hydraulic pressure chamber 41 in the valve operation/stoppage switchover means $40_1$ to stop the opening and closing of the intake valve $V_I$ and the exhaust valve $V_E$.

The solenoid fluid pressure control valve means $58_2$, $58_3$ and $58_4$ independently corresponding to the valve operation/stoppage switchover means $40_2$, $40_3$ and $40_4$ for the second, third and fourth cylinders $C_2$, $C_3$ and $C_4$ are constructed in the same manner as the above-described solenoid fluid pressure control valve means $58_1$.

The switchover operation of each of solenoid fluid pressure control valve means $58_1$, $58_2$, $58_3$ and $58_4$ and thus the deenergization and energization of the solenoid switchover valves 74 in the switchover operation of each of solenoid fluid pressure control valve means $58_1$, $58_2$, $58_3$ and $58_4$ is controlled by a control unit 75.

Figure 8:
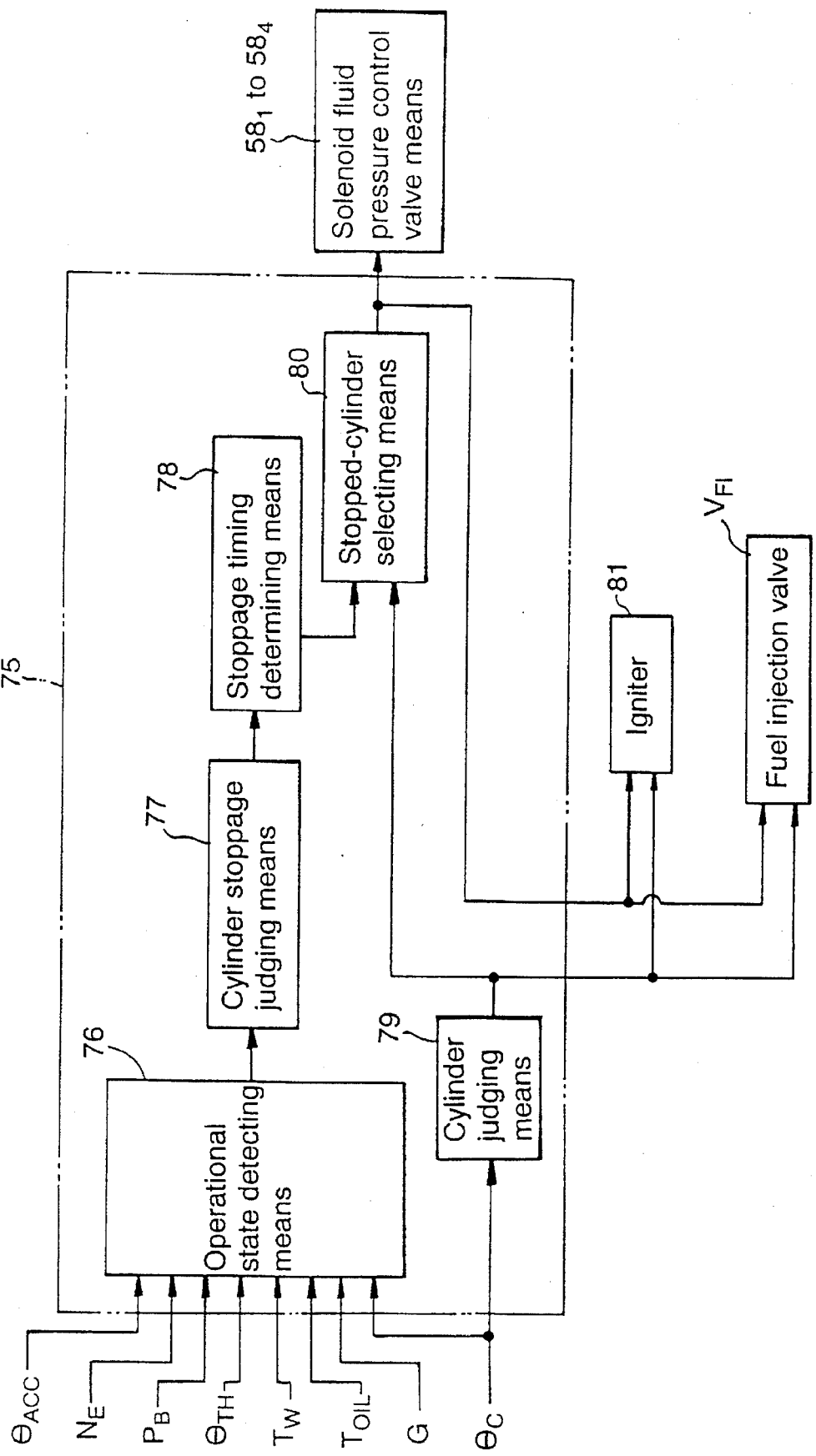
FIG. 8 is a block diagram illustrating the arrangement of a control unit.

Referring to FIG. 8, the control unit 75 includes an operational state detecting means 76 for detecting he operational state of the engine based on an accelerator opening degree $\theta_{ACC}$, a number $N_E$ of revolutions of the engine, an intake pressure $P_B$, a throttle opening degree $\theta_{TH}$, a temperature $T_W$ of engine-cooling water, an oil temperature $T_{OIL}$, a shift gear ratio G, a crankshaft angle $\theta_C$ and the like, a cylinder stoppage judging means 77 for judging whether the stoppage of the cylinders should be carried out based on the operational state detected by the operational state detecting means 76, a stoppage-timing determining means 78 for determining the timing of stoppage of the intake valve $V_I$ in each of the cylinders $C_1$, $C_2$, $C_3$ and $C_4$ in the operational state in which the stoppage of the cylinders should be carried out, a cylinder judging means 79 for judging the cylinder which is in a compression stroke, based on the crankshaft angle $\theta_C$, and a stopped-cylinder selecting means 80 for selecting the stopped cylinder based on signals from the cylinder judging means 79 and the stoppage-timing determining means 78 to carry out the switching operation of each of the solenoid fluid pressure control valve means $58_1$, $58_2$, $58_3$ and $58_4$, i.e., each of the valve operation/stoppage switchover means $40_1$, $40_2$, $40_3$ and $40_4$.

In order to carry out the stoppage of the spark plug P and the stoppage of the injection of fuel in parallel to the stoppage of the operation of the intake valve $V_I$ and the exhaust valve $V_E$, signals from the cylinder judging means 79 and the stopped-cylinder selecting means 80 are supplied in parallel to the igniter 81 and fuel-injection valves $V_{FI}$ in the cylinders $C_1$, $C_2$, $C_3$ and $C_4$.

In the cylinder stoppage judging means 77 in the control unit 75, it is judged whether the engine is in the operational state in which the stoppage of the cylinders should be carried out, when the engine is being warmed and moreover, each of the engine load and the engine revolution-number $N_E$ is in a predetermined range.

In the stoppage-timing determining means 78, a plurality of control modes having different engine valve stopping cycles are established, for example, two different engine valve stopping cycles are shown in Tables 1 and 2. Each of these control modes is selected depending upon the operational state of the engine.

TABLE 1

| First cylinder $C_1$ | O | X | X | O | X | X |
|---|---|---|---|---|---|---|
| Second cylinder $C_2$ | O | X | X | O | X | X |
| Third cylinder $C_3$ | X | X | O | X | X | O |
| Fourth cylinder $C_4$ | X | O | X | X | O | X |
| Crankshaft rotations | 2 rotations | 4 rotations | 6 rotations | 8 rotations | 10 rotations | 12 rotations |

TABLE 2

| First cylinder $C_1$ | O | X | O | X | O | X |
|---|---|---|---|---|---|---|
| Second cylinder $C_2$ | O | O | X | X | O | O |
| Third cylinder $C_3$ | X | O | X | O | X | O |
| Fourth cylinder $C_4$ | X | X | O | O | X | X |
| Crankshaft rotations | 2 rotations | 4 rotations | 6 rotations | 8 rotations | 10 rotations | 12 rotations |

In Tables 1 and 2, O indicates the operational state, and X indicates the stopped state. In Table 1, the stopping cycles for each of the cylinders $C_1$, $C_2$, $C_3$ and $C_4$ are determined at equal intervals, so that two runs of stoppage subsequent to one run of the operation are repeated. The cycle of stoppage of the engine valve in each of the cylinders $C_1$, $C_2$, $C_3$ and $C_4$ is repeated at equal intervals. In the contrast, in Table 2, the cycles of stoppage for each of the first and third cylinders $C_1$ and $C_3$ are determined in an equivalent manner such that one run of the stoppage and one run of the operation are alternately repeated, and the cycles of stoppage of each of the second and fourth cylinders $C_2$ and $C_4$ are established non-uniformly such that two runs of the operation are continued after two runs of the stoppage. In other words, the stoppage cycles are determined so that three runs of stoppage are as effected at 12 rotations of the crankshaft in the first and third cylinders $C_1$ and $C_3$, 4 runs of stoppage are effected at 12 rotations of the crankshaft in the fourth cylinder $C_4$, and only 2 runs of stoppage are effected at 12 rotations of the crankshaft in the second cylinder $C_2$ (the third and fourth runs of stoppage for the second cylinder $C_2$ occur at the fourteenth and sixteenth rotations of the crankshaft). Moreover, in Table 1, the phases of at least two cylinders, e.g., the first or second cylinder $C_1$ or $C_2$ and the third or fourth cylinder $C_3$ or $C_4$ in the stoppage cycles are different from each other, and in Table 2, the phases of all the cylinders $C_1$, $C_2$, $C_3$ and $C_4$ in the stoppage cycles are different from one another.

The operation of the first embodiment will be described below. The control unit 75 controls the switching operations of the valve operation/stoppage switchover means $40_1$, $40_2$, $40_3$ and $40_4$ independent from one another in the cylinders $C_1$, $C_2$, $C_3$ and $C_4$, so that the operation and stoppage of the intake valve $V_I$ and the exhaust valve $V_E$ in each of the cylinders $C_1$, $C_2$, $C_3$ and $C_4$ are repeated according to the stoppage cycle determined for each of the cylinders $C_1$, $C_2$, $C_3$ and $C_4$, when the engine is in its cylinder operation-stopped operational state. Thus, it is possible to maintain the warmed state in all the cylinders $C_1$, $C_2$, $C_3$ and $C_4$ and to eliminate an imbalance that may otherwise be produced between the cylinders in the prior art internal combustion engine designed so that only a selected one or more of the cylinders is stopped continuously, thereby preventing an increase in fuel consumption and a deterioration in the nature of an exhaust gas.

In addition, any of the plurality of control modes determined for each of the cylinders $C_1$, $C_2$, $C_3$ and $C_4$ to have the different stoppage cycles for the intake valve $V_I$ can be selected in accordance with the operational state of the engine. Thus, it is possible to achieve a reduction in pumping loss and a reduction in fuel consumption more suitable to the operational state of the engine by selecting the control mode suitable to the operational state of the engine in consideration of an imbalance of oil rise or oil drop in the stopped cylinder, an engine power output, a fuel consumption, a vibration and the like. Moreover, in the operational state in which one or more of the cylinders should be stopped, the cylinder-stopped operation can be continued and thus, it is possible to achieve sufficient reductions in pumping loss and fuel consumption due to the stoppage of the cylinders. The stoppage cycles of the intake valves $V_I$ in the cylinders $C_1$, $C_2$, $C_3$ and $C_4$ are determined so that the phases are different between at least two cylinders and hence, it is possible to perform a smooth operation of the engine in the cylinder-stopped state.

A comparison of the stoppage cycles of the engine valves shown in Tables 1 and 2 and the stoppage cycles of the engine valves in the prior art engine that only stops two specific cylinders can be shown in the sequence of the ignited cylinders $C_1$, $C_2$, $C_3$ and $C_4$ as given in Table 3 below.

chance is 2/3 (1/2), and in the internal combustion engine of the type in Table 2, the explosion chance is 1/2, but in the internal combustion engine of the type in Table 1, the explosion chance is 1/3. Thus, in the timing of stoppage as shown in Table 1, the explosion chance can be decreased more, thereby widening the loading range in the cylinder-stopped operation and reducing the fuel consumption more. Moreover, the ignition interval is uniform in the internal combustion engine of the type in Table 1, while the ignition interval is non-uniform in the internal combustion engine of the type in Table 2.

Figure 9:
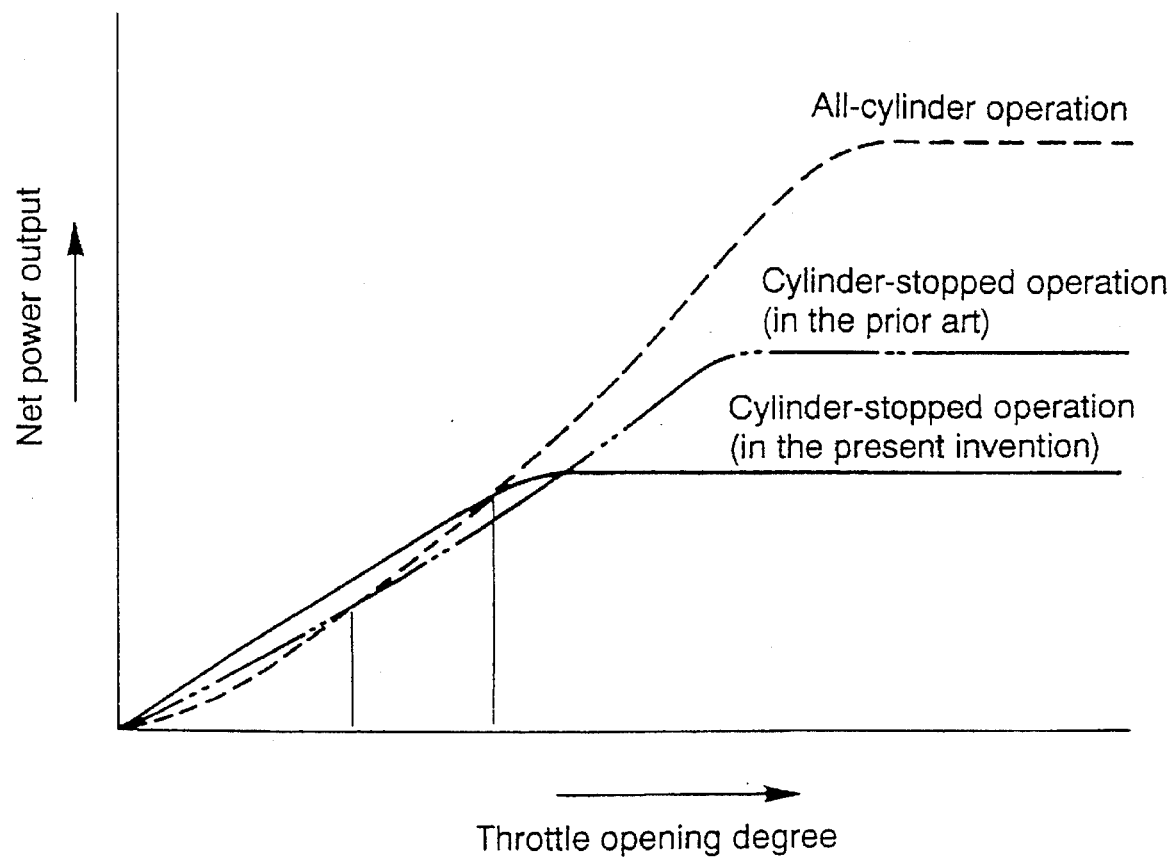
FIG. 9 is a graph illustrating a point of switching of the cylinder stoppage and the operation of all cylinders in comparison with the prior art.

Thus, at an extremely small throttle opening degree, as shown in FIG. 9, a net power output from the engine in the cylinder-stopped operation is higher by a decrement of pumping loss than that in the all cylinder-operated operation, and as the throttle opening degree is increased, the net power output in the cylinder-stopped operation is decreased by a decrement corresponding to the stoppage of the cylinders. Therefore, there is a cross point between the cylinder-stopped operation and the all-cylinder-operated operation. It is known that the switching between the all-cylinder-operated operation and the cylinder-stopped operation is carried out at this cross point. In this case, it is possible to decrease the pumping loss more by decreasing the explosion chance and hence, the throttle opening degree can be shifted to a level higher than the cross point, as compared with the prior art. Accordingly, it is possible to widen the loading range in the cylinder-stopped operation and to increase the proportion of the cylinder-stopped operation in the engine operating mode to further reduce the fuel consumption.

Figure 10:
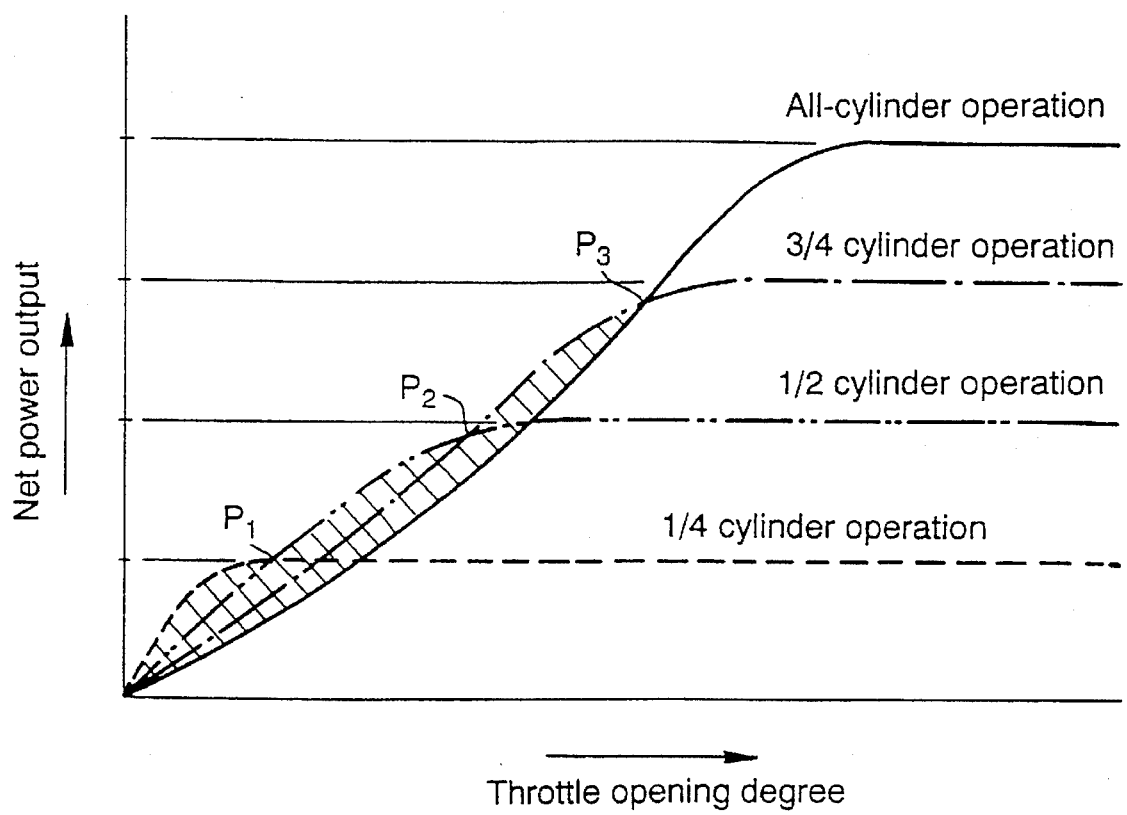
FIG. 10 is a diagram illustrating a variation in output due to a variation in the number of cylinders stopped.

As shown in FIG. 10, the engine can be switched between an operational state in which three of the four cylinders are stopped, an operational state in which two of the four cylinders are stopped, an operational state in which one of the four cylinders is stopped, and an operational state in which all the cylinders are operated, so that the number of the stopped cylinders are sequentially switched at each of cross points $P_1$, $P_2$ and $P_3$ between the operational states in a small range of the throttle opening degree. Thus, it is possible to reduce the pumping loss in a region indicated by oblique lines in FIG. 10 to increase the power output.

Further, as shown in Table 4, a plurality of control modes, e.g., an A mode, a B mode and a C mode may be established in which the stoppage cycles of the engine valves in the cylinders $C_1$, $C_2$, $C_3$ and $C_4$ are different, but the frequency of stoppages of the intake valve $V_I$ at a predetermined number of rotations of a crankshaft is uniform between the

TABLE 3

| | Ignited cylinders | | | | | | | | | | | | | | | |
|---|---|---|---|---|---|---|---|---|---|---|---|---|---|---|---|---|
| | all cylinders first cycle | | | | all cylinders second cycle | | | | all cylinders third cycle | | | | all cylinders fourth cycle | | | |
| Stoppage type | $C_1$ | $C_3$ | $C_4$ | $C_2$ | $C_1$ | $C_3$ | $C_4$ | $C_2$ | $C_1$ | $C_3$ | $C_4$ | $C_2$ | $C_1$ | $C_3$ | $C_4$ | $C_2$ |
| Non-stopped | O | O | O | O | O | O | O | O | O | O | O | O | O | O | O | O |
| Stopped in the prior art | X | O | X | O | X | O | X | O | X | O | X | O | X | O | X | O |
| Type in Table 1 | O | X | X | O | X | X | O | X | X | O | X | X | O | X | X | O |
| Type in Table 2 | O | X | X | O | X | O | X | O | O | X | O | X | X | O | O | X |

As is apparent from Table 3, in the internal combustion engine designed so that only the same one or more selected cylinders may be stopped as in the prior art, the explosion cylinders $C_1$, $C_2$, $C_3$ and $C_4$, and any of the control modes may be selected in accordance with the engine operational state.

TABLE 4

|  | A mode | | | | B mode | | | | | | C mode | | | | | | | | |
|---|---|---|---|---|---|---|---|---|---|---|---|---|---|---|---|---|---|---|---|
| $C_1$ | X | O | X | O | X | X | O | O | X | X | X | X | O | O | O | X | X | X | |
| $C_2$ | O | X | O | X | O | O | X | X | O | O | O | O | X | X | X | O | O | O | |
| $C_3$ | O | X | O | X | O | O | X | X | O | O | O | O | X | X | X | O | O | O | |
| $C_4$ | X | O | X | O | X | X | O | O | X | X | X | X | O | O | O | X | X | X | |
| Crankshaft rotations | 2 | 4 | 6 | 8 | 2 | 4 | 6 | 8 | 10 | 12 | 2 | 4 | 6 | 8 | 10 | 12 | 14 | 16 | 18 |

By determining the stoppage cycle in which the intake valves $V_I$ in each of the cylinders $C_1$, $C_2$, $C_3$ and $C_4$ are stopped the same times at a predetermined number of rotations of a crankshaft in this manner, it is possible to maintain the temperature condition based on the cylinder stoppage identically in the cylinders $C_1$, $C_2$, $C_3$ and $C_4$.

A second embodiment of the present invention will now be described with reference to FIGS. 11 to 15 in which components that are identical or substantially similar to components of the first embodiment are identified by the same numerals and will not be described in detail here.

Figure 11:
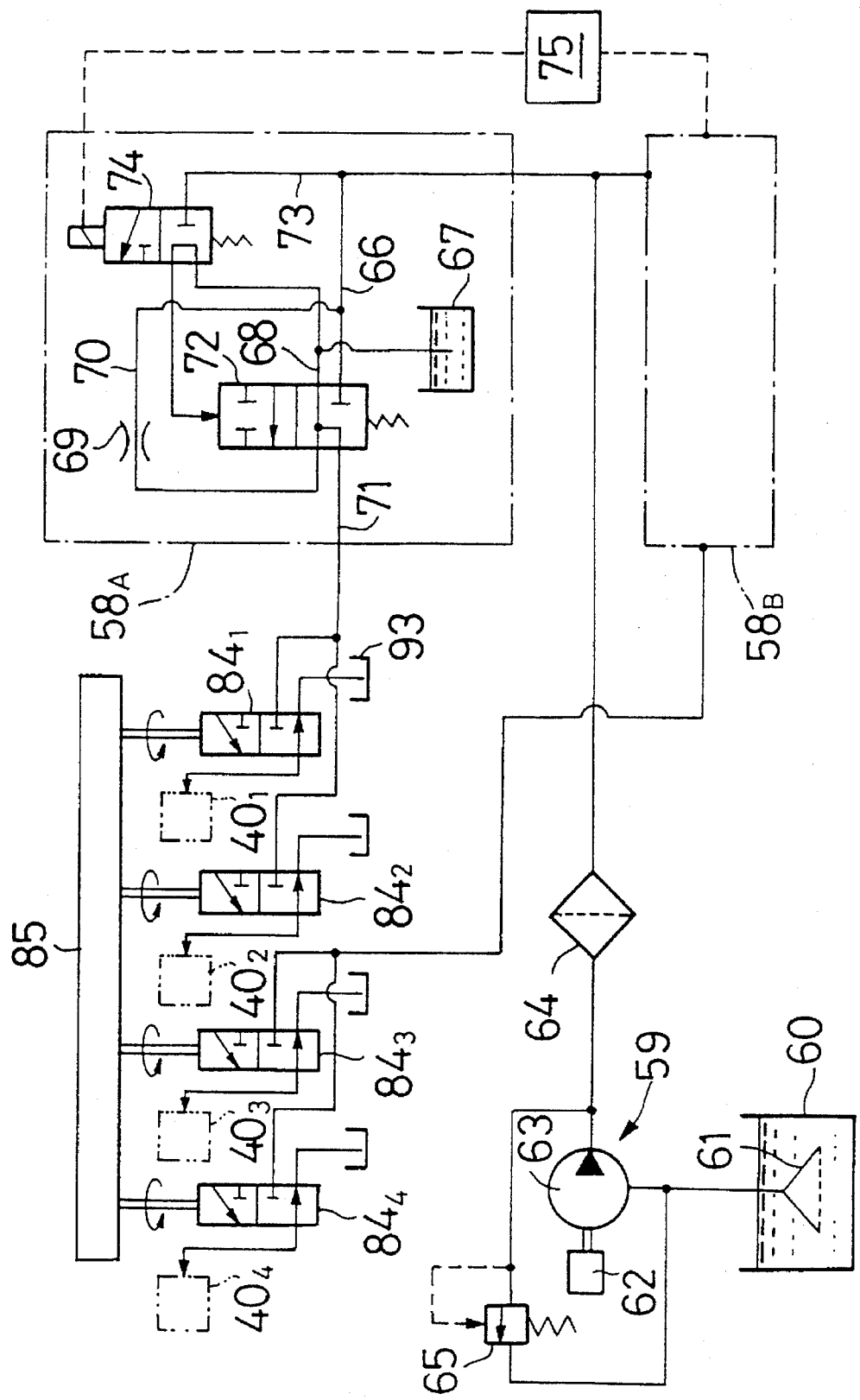
FIG. 11 is a diagram illustrating a second embodiment of the hydraulic pressure circuit connected to the valve operation and stoppage switchover means.

Referring first to FIG. 11, a valve operation/stoppage switchover means $40_1$ in the first cylinder $C_1$ is connected to a solenoid fluid pressure control valve means $58_A$ through a rotary valve $84_1$. A valve operation/stoppage switchover means $40_2$ in the second cylinder $C_2$ is connected to the solenoid fluid pressure control valve means $58_A$ through a rotary valve $84_2$. A valve operation/stoppage switchover means $40_3$ in the third cylinder $C_3$ is connected to a solenoid fluid pressure control valve means $58_B$ through a rotary valve $84_3$. A valve operation/stoppage switchover means $40_4$ in the fourth cylinder $C_4$ is connected to the solenoid fluid pressure control valve means $58_B$ through a rotary valve $84_4$. In other words, the single solenoid fluid pressure control valve means $58_A$ and the single solenoid fluid pressure control valve means $58_B$ for controlling the application and releasing of a hydraulic pressure to and from a hydraulic pressure source 59 are disposed for a group consisting of the first and second cylinders $C_1$ and $C_2$ and a group consisting of the third and fourth cylinders $C_3$ and $C_4$, respectively, and independent rotary valves $84_1$, $84_2$, $84_3$ and $84_4$ are provided between the solenoid fluid pressure control valve means $58_A$ and $58_B$ and the valve operation/stoppage switchover means $40_1$, $40_2$, $40_3$ and $40_4$, respectively.

Each of the solenoid fluid pressure control valve means $58_A$ and $58_B$ has the same construction as the solenoid fluid pressure control valve means $58_1$ shown in FIG. 7 in the first embodiment, and is controlled by the control unit 75.

The rotary valves $84_1$, $84_2$, $84_3$ and $84_4$ are mechanically operated valves for determining the timing of supplying of a working fluid to the valve operation/stoppage switchover means $40_1$, $40_2$, $40_3$ and $40_4$ by a mechanical operation synchronous to the crankshaft rotation. For example, a rotative power from the cam shaft 30 is transmitted to each of the rotary valves $84_1$, $84_2$, $84_3$ and $84_4$ through a timing transmitting means 85.

Figure 12:
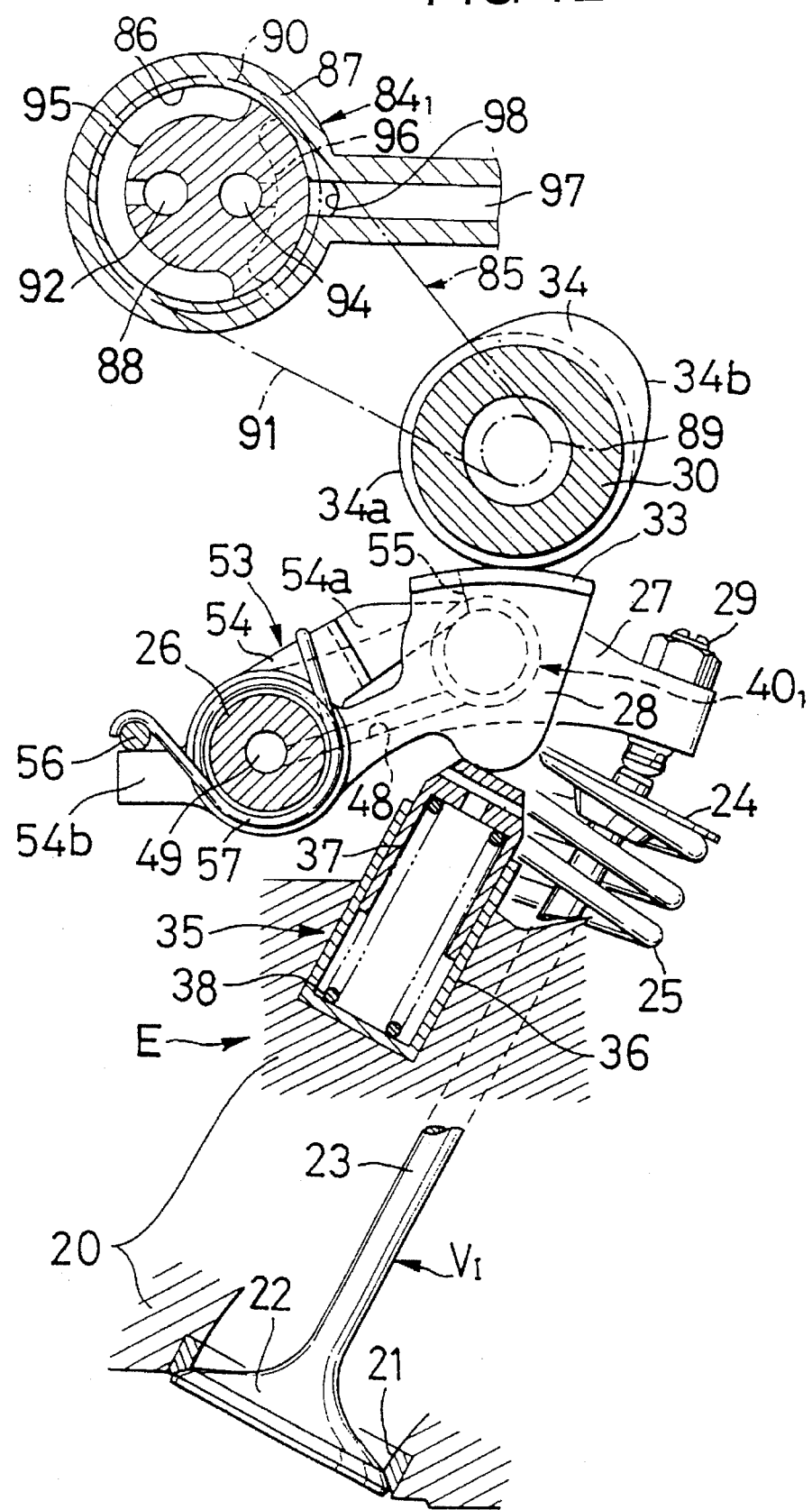
FIG. 12 is a vertical sectional view similar to FIG. 4, but illustrating a hydraulic valve operating device for an intake valve in this second embodiment.
Figure 13:
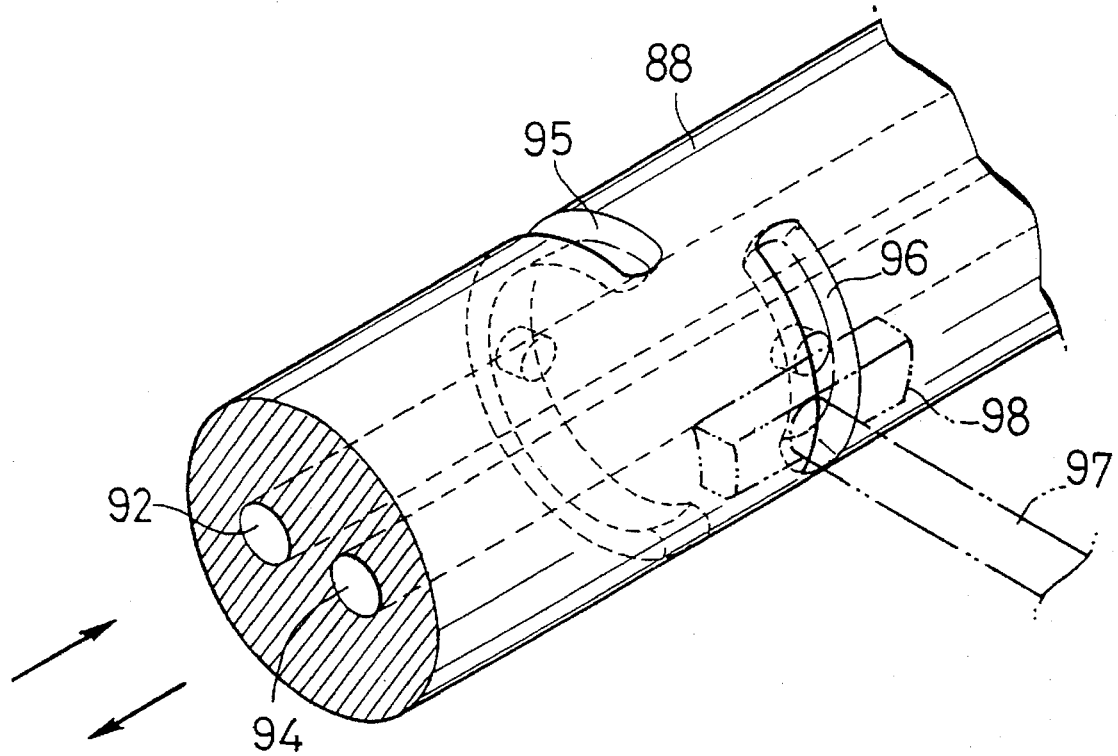
FIG. 13 is a perspective view illustrating the construction of a rotary valve shown in FIG. 12.

Referring also to FIGS. 12 and 13, the rotary valve $84_1$ includes a housing 87 fixedly mounted on the cylinder head 20 of the engine body E and having a slide hole 86, circular in cross section and extending parallel to the cam shaft 30, and a columnar valve member 88 rotatably fitted in the slide hole 86 for rotation about the axis of the slide hole 86.

The timing transmitting means 85 includes a transmitting band 91 such as an endless chain or belt wound, for example, around a timing ring 89 fixed to the cam shaft 30 and a timing ring 90 fixed to the valve member 88, as shown in FIG. 12. Moreover, in the stoppage cycle in which two runs of the stoppage subsequent to one run of the operation are repeated as shown in Table 1, the ratio of the outside diameter of the timing ring 90 to the outside diameter of the timing ring 89 is set at 1:3.

The valve member 88 is provided with an oil supplying passage 92 leading to the solenoid fluid pressure control valve means $58_A$, and an oil discharging passage 94 leading to a reservoir of the same type as or a different type than the reservoirs 60 and 67. Further, an oil supplying groove 95 is provided in an outer periphery of the valve member 88 to lead to the oil supplying passage 92, and an oil discharging groove 96 is also provided in the outer periphery of the valve member 88 to lead to the oil discharging passage 94. The oil supplying groove 95 is defined over an extent of approximately 240 degrees about the axis of the valve member 88, and the oil discharging groove 96 is defined at a location axially spaced apart from the oil supplying groove 95 in the axial direction of the valve member 88 over an extent of approximately 120 degrees excluding the region in which the oil supplying groove 95 is provided.

On the other hand, an oil passage 97 is provided in the housing 87 to lead to the oil passage 49 in the valve operation/stoppage means $40_1$, and a communication groove 98 is also provided in the housing 87 to lead to the oil passage 97 and opens into an inner surface of the slide hole 86. The communication groove 98 is defined along the axis of the slide hole 86, so that it can be put into communication with either of the oil supplying groove 95 or the oil discharging groove 96 in response to the rotation of the valve member 88.

In such rotary valve $84_1$, when the solenoid fluid pressure control valve means $58_A$ is brought into a hydraulic pressure-applied state, i.e., when the solenoid switchover valve 74 is brought into an energized state, the rotary valve $84_1$ is operated as shown as the time line (c) in FIG. 14, and in response to this operation, the intake valve $V_I$ is stopped two times in succession after being operated one time, as shown as (d) in FIG. 14.

Figure 15A:
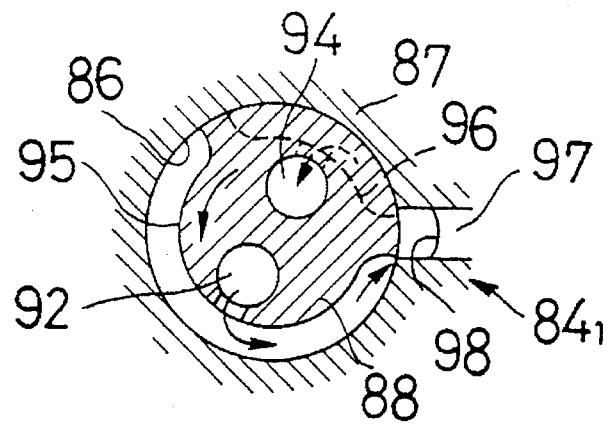
FIGS. 15A, 15B, 15C and 15D are diagrams illustrating the course of operation of the rotary valve of this second embodiment.
Figure 15B:
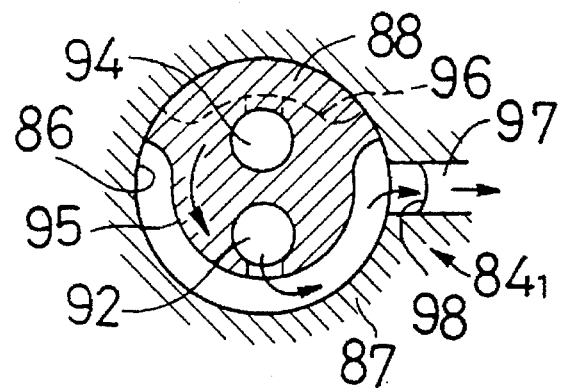

In other words, the valve member 88 of the rotary valve $84_1$ is rotated one time as shown as (b) in FIG. 14 in response to three runs of the rotation of the crankshaft as shown as (a) in FIG. 14. Up to a time point $t_1$ immediately after completion of the first one run of the rotation through a crankshaft angle of 360 degrees, the valve member 88 is in a state in which it permits the oil discharging groove 96 to be put into communication with the oil passage 97 for releasing the hydraulic pressure, as shown in FIG. 15A. When the oil supplying passage 95 is put into communication with the oil passage 97 at the time point $t_1$, a hydraulic pressure is applied to the hydraulic pressure chamber 41 in the valve operation/stoppage switchover means $40_1$. At a time point $t_2$ when the intake valve $V_I$ is brought into a closed and stopped state as a result of lifting of the trigger plate portion 54a of the trigger plate 54 in the trigger mechanism 53 with the operation of the intake valve $V_I$, the valve operation/stoppage switchover means $40_1$ is switched from the connecting state to the disconnecting state, as shown as (f) in FIG. 14. During this time, the valve member 88 of the rotary valve $84_1$ is in a state in which the oil supplying groove 96 is in communication with the oil passage 97, as shown in FIG. 15B. Therefore, even at the normal time for a second opening of the intake valve $V_I$, the intake valve $V_I$ is left closed and stopped.

Figure 15C:
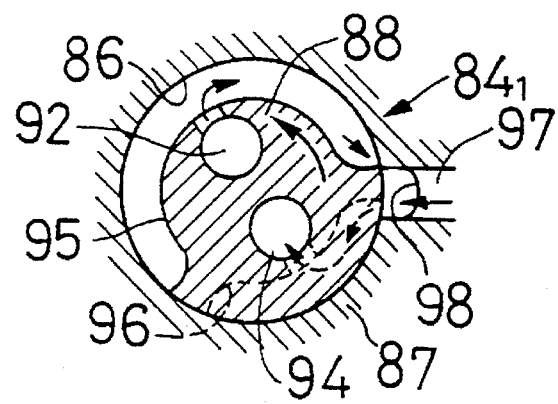
Figure 15D:
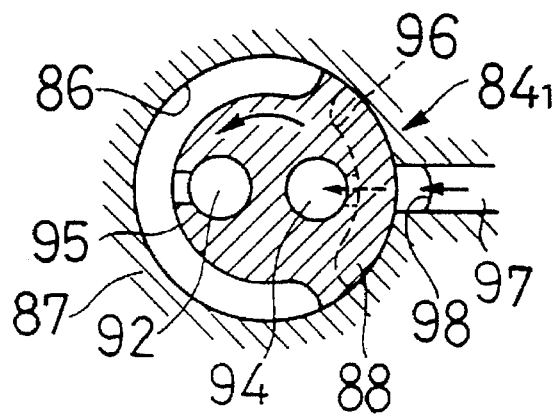

Even when the normal time for a third opening of the intake valve $V_I$ is reached, the valve member 88 is left in the state in which the oil supplying groove 95 is in communication with the oil passage 97. Therefore, the intake valve $V_I$ is left closed and stopped even at the third opening time. Thus, at a time point $t_3$ in the middle of the third opening time, the rotary valve $84_1$ is brought into a state in which the oil discharging groove 96 is in communication with the oil passage 97, so that the working oil is discharged from the oil passage 97, as shown in FIG. 15C. Then, as the trigger plate portion 54a of the trigger plate 54 in the trigger mechanism 53 is lifted, the valve operation/stoppage switchover means $40_1$ is switched from the disconnecting state to the connecting state at a time when the intake valve $V_I$ in the closed and stopped state is stopped, i.e., at a time point $t_4$ when the free rocker arm 28 abuts against the base-circle portion 34a of the operating cam 34. Thereafter, the valve member 88 is returned from a position in which the oil discharging groove 96 has been put into communication with the oil passage 97, as shown in FIG. 15D to the position shown in FIG. 15A.

In this manner, when the intake valve $V_I$ is to be closed and stopped, the rotary valve $84_1$ mechanically controls the application and releasing of the hydraulic pressure to and from the valve operation/stoppage switchover means $40_1$ so that the intake valve $V_I$ is stopped two times subsequent to one run of the operation of the intake valve $V_I$.

For the exhaust valve $V_E$ in the first cylinder $C_1$, a rotary valve $84_1$ similar to the above-described rotary valve is connected to a valve operation/stoppage switchover means $40_1$ for the exhaust valve $V_E$. The exhaust valve $V_E$ is also controlled so that it is stopped two times subsequent to one run of operation.

The timing of stoppage of each of the intake valves $V_I$ and the exhaust valves $V_E$ in the second, third and fourth cylinders $C_2$, $C_3$ and $C_4$ is controlled by each of rotary valves $84_2$, $84_3$ and $84_4$ similar to the rotary valve 84, in the first cylinder $C_1$.

In the second embodiment, the timing of supplying of the working fluid to each of the valve operation/stoppage switchover means $40_1$, $40_2$, $40_3$ and $40_4$ in the cylinders $C_1$, $C_2$, $C_3$ and $C_4$ is controlled by each of the rotary valves $84_1$, $84_2$, $84_3$ and $84_4$ which are mechanically operated in operative association with the crankshaft rotation. Therefore, it is unnecessary to carry out the step of judgment of the cylinders. Moreover, whereas a delay of a signal, a delay of an increase in the hydraulic pressure and the like are generated when a control is carried out based on the judgment of the cylinders, it is unnecessary to give such a consideration with the rotary valves. Further, the solenoid fluid pressure control valve means $58_A$ and the solenoid fluid pressure control valve means $58_B$ may be provided for the respective groups cylinders and therefore, the number of relatively expensive solenoid valves and other components can be decreased.

However, depending upon the timings of the application and releasing of the hydraulic pressure, the exhaust valve $V_E$ may be closed and stopped after the opening of the intake valve $V_I$, thereby making a smooth removal of a combustion gas difficult, and/or the exhaust valve $V_E$ may be opened after closing and stoppage of the intake valve $V_I$ to cause a back flow of the combustion gas from the exhaust manifold $M_E$. Accordingly, it is desirable that the timing of application of the hydraulic pressure is controlled by the solenoid fluid pressure control valve means $58_A$ and $58_B$ for respective cylinder groups in each of which cylinder groups such a disadvantage is difficult to occur, e.g., for the group of the first and second cylinders $C_1$ and $C_2$ and for the group of the third and fourth cylinders $C_3$ and $C_4$.

Figure 16:
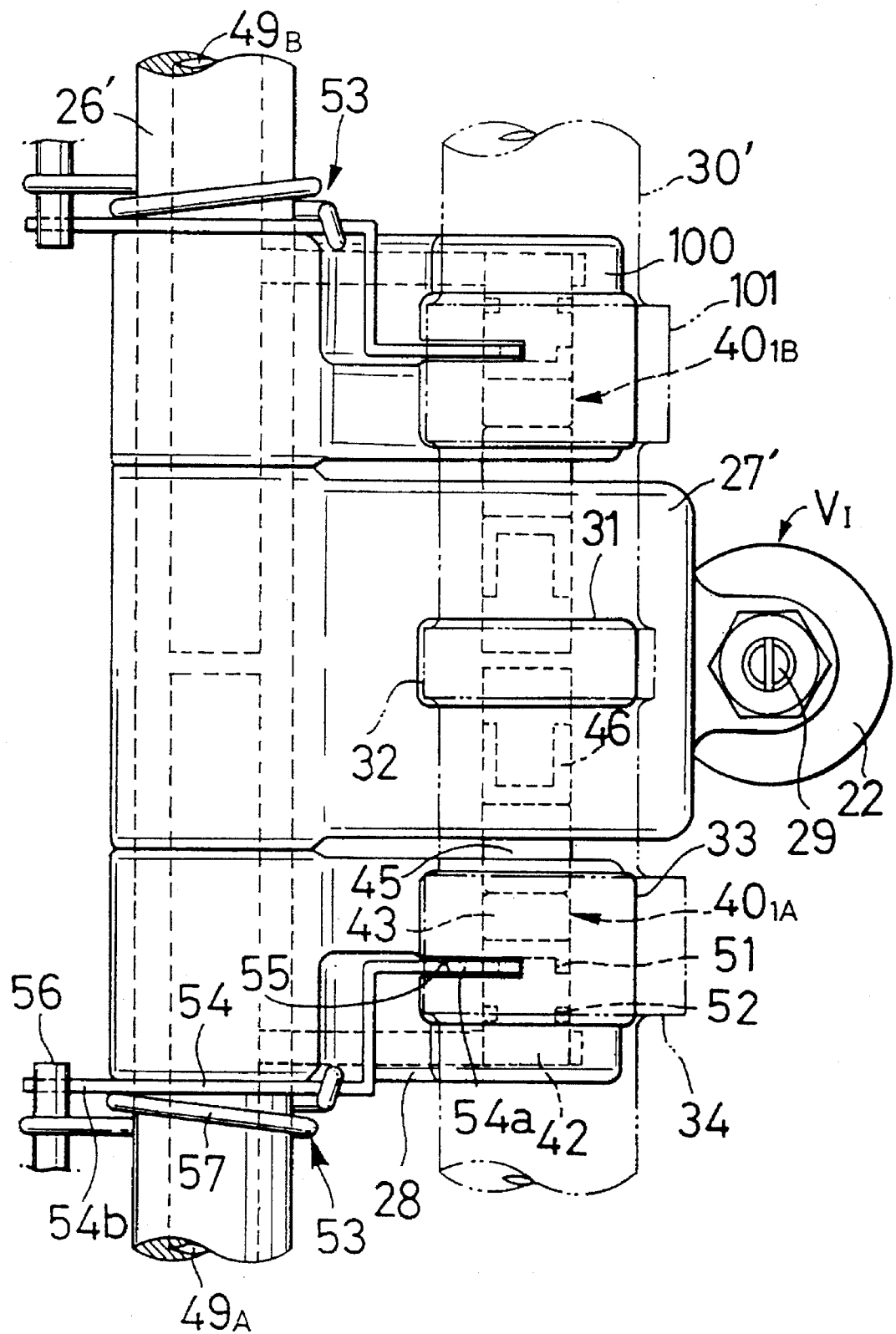
FIG. 16 is a plan view similar to FIG. 2, but illustrating a third embodiment.

FIG. 16 illustrates a third embodiment of the present invention, wherein portions or components corresponding to those in each of the above-described embodiments are designated by like reference characters.

A driving rocker arm 27' operatively connected to the intake valve $V_I$, a first free rocker arm 28 adjoining one side of the driving rocker arm 27', and a second free rocker arm 100 adjoining the other side of the driving rocker arm 27' are swingably carried on a rocker arm shaft 26'. A cam shaft 30' is integrally provided with a rest portion 32 which is in sliding contact with the driving rocker arm 27', a first operating cam 34 which is in sliding contact with the first free rocker arm 28, and a second operating cam 101 which is in sliding contact with the second free rocker arm 100. The first operating cam 34 has a cam profile corresponding to a high speed operating range of the engine, while the second operating cam 101 has a cam profile corresponding to a lower speed operating range than that of the first operating cam 34.

A connection switchover means $40_{1A}$ is provided between the driving rocker arm 27' and the first free rocker arm 28 and is capable of switching the connection and disconnection of the rocker arms 27' and 28 to and from each other. A connection switchover means $40_{1B}$ is provided between the driving rocker arm 27' and the second free rocker arm 100 and is capable of switching the connection and disconnection of the rocker arms 27' and 100 to and from each other. Each of the connection switchover means $40_{1A}$ and $40_{1B}$ has basically the same construction as the valve operation/stoppage switchover means $40_1$ in the first embodiment, and is switchable between a connecting state provided upon releasing of the hydraulic pressure, and a disconnecting state provided upon application of the hydraulic pressure. Moreover, the rocker arm shaft 26' includes an oil passage $49_A$ connected to the connection switchover means $40_{1A}$, and an oil passage $49_B$ connected to the connection switchover means $40_{1B}$, these oil passages $49_A$ and $49_B$ being independently provided in the rocker arm shaft 26'. The connection switchover means $40_{1A}$ and $40_{1B}$ are capable of being independently operated for switching.

The third embodiment enables the following conditions to be switched from one to the other: a condition in which both of the connection switchover means $40_{1A}$ and $40_{1B}$ are brought into disconnecting states to stop the intake valve $V_I$, a condition in which the connection switchover means $40_{1B}$ is brought into the connecting state, while the connection switchover means $40_{1A}$ is brought into the disconnecting state, thereby opening and closing the intake valve $V_I$ by the second operating cam 101, and a condition in which the connection switchover means $40_{1A}$ is brought into the connecting state, while the connection switchover means $40_{1B}$ is brought into the disconnecting, thereby opening and closing the intake valve $V_I$ by the first operating cam 34. In addition, it is possible to switch the valve operating characteristics in the valve-operated condition to enable a valve-operation control more suitable to the operational state of the engine.

Figure 17:
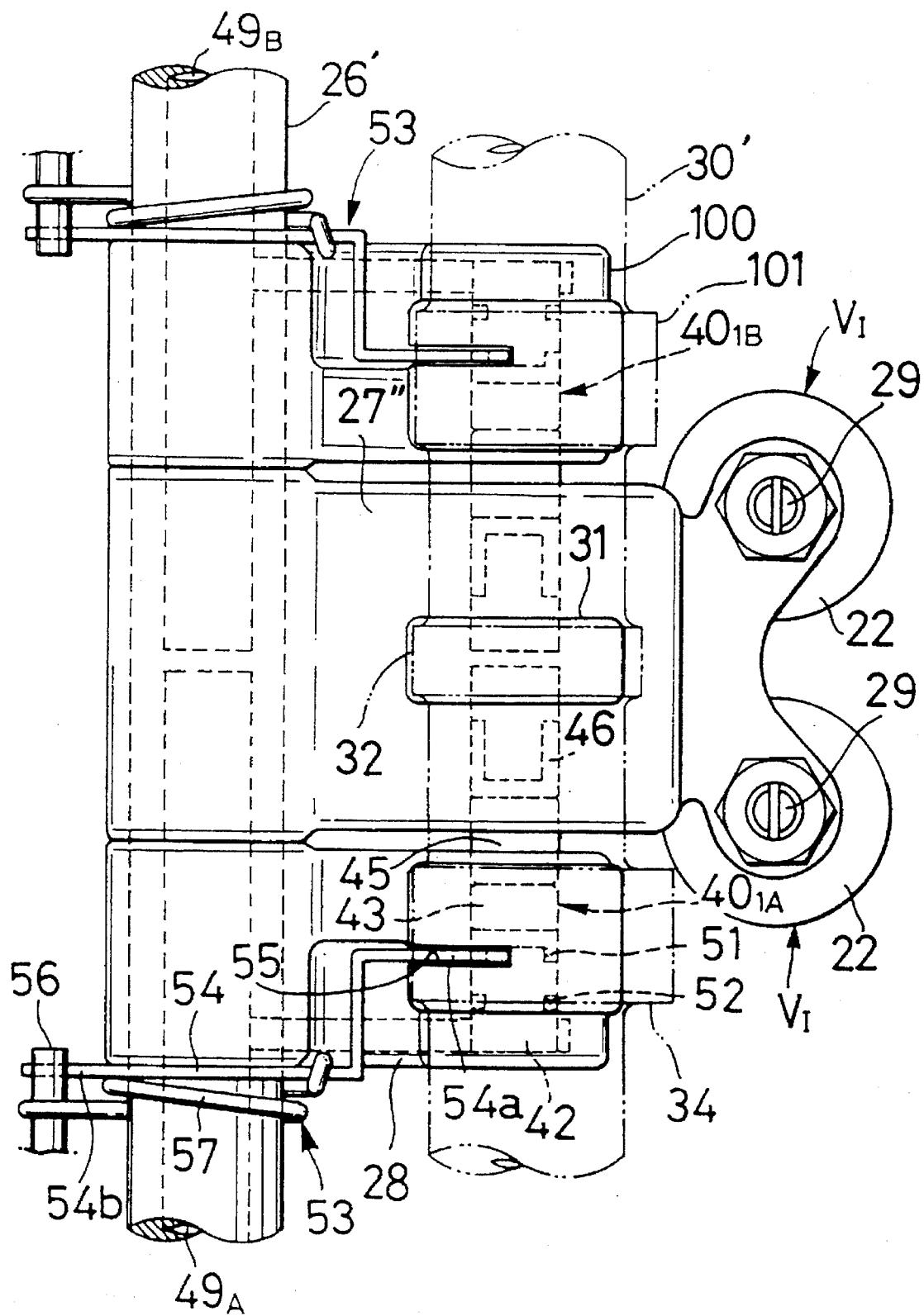
FIG. 17 is a plan view similar to FIG. 2, but illustrating a fourth embodiment.

FIG. 17 illustrates a fourth embodiment of the present invention. In the fourth embodiment, a driving rocker arm 27" is swingably carried on a rocker arm shaft 26' between a first free rocker arm 28 which is in sliding contact with the first operating cam 34, and a second free rocker arm 100 which is in sliding contact with the second operating cam 101. The driving rocker arm 27" is operatively connected to a pair of intake valves $V_I$, $V_I$ and is in sliding contact with the rest portion 32. A connection switchover means $40_{1A}$ is provided between the driving rocker arm 27" and the first free rocker arm 28 and is capable of switching the connection and disconnection of the rocker arms 27" and 28 to and from each other. A connection switchover means $40_{1B}$ is provided between the driving rocker arm 27" and the second free rocker arm 100 and is capable of switching the connection and disconnection of the rocker arms 27" and 100 to and from each other.

The fourth embodiment enables the following conditions to be switched from one to the other: a condition in which the pair of intake valves $V_I$, $V_I$ are stopped, a condition in which the pair of intake valves $V_I$, $V_I$ are opened and closed by the second operating cam 101, and a condition in which the pair of intake valves $V_I$, $V_I$ are opened and closed by the first operating cam 34.

Figure 18:
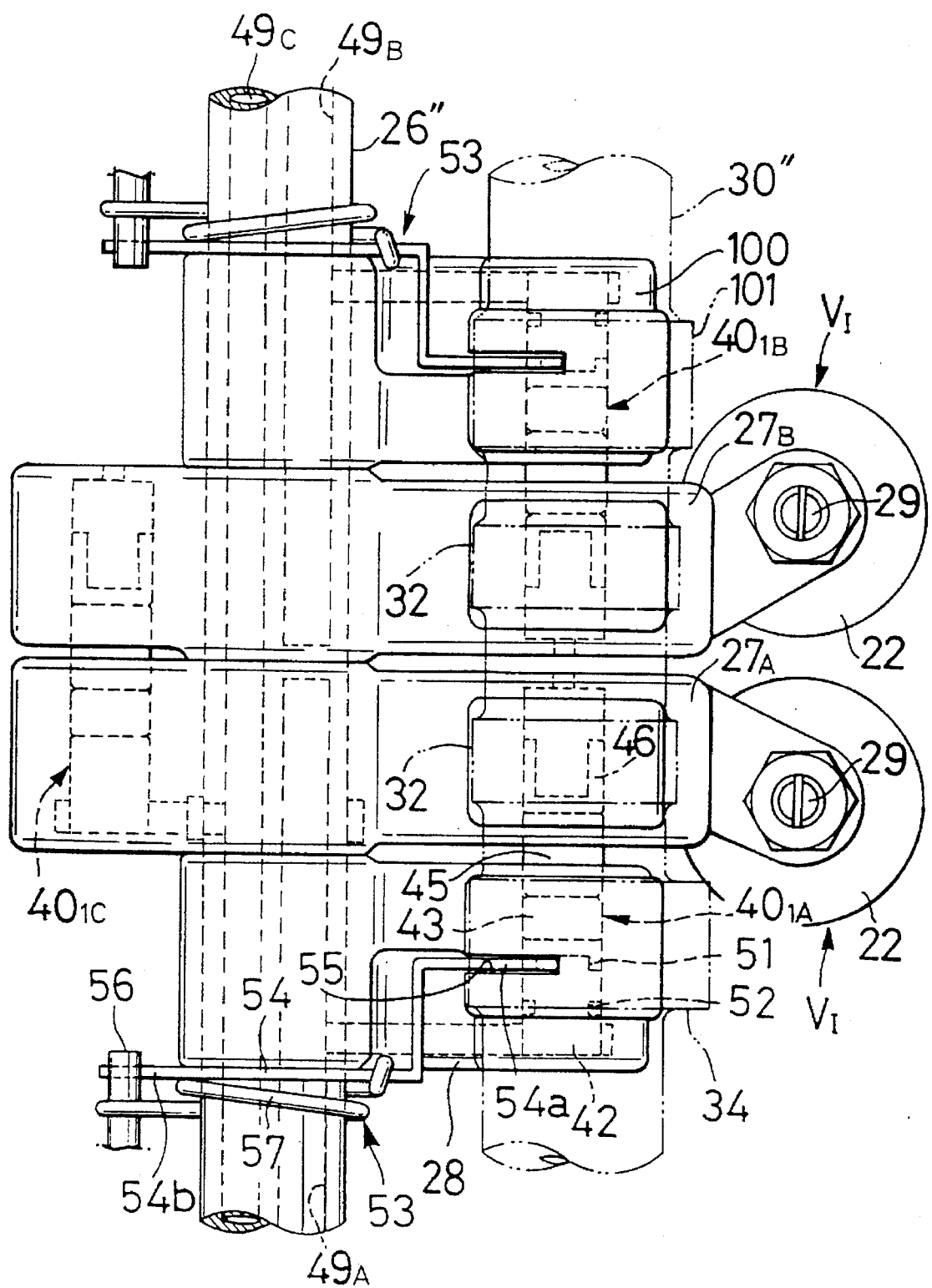
FIG. 18 is a plan view similar to FIG. 2, but illustrating a fifth embodiment.

FIG. 18 illustrates a fifth embodiment of the present invention, wherein portions or components corresponding to those in each of the above-described embodiments are designated by like reference characters.

Swingably carried on the rocker arm shaft 26" are: a first driving rocker arm $27_A$ to which one of a pair of intake valves $V_I$, $V_I$ is operatively connected; a second driving rocker arm $27_B$ to which the other intake valve $V_I$ is operatively connected and which adjoins the first driving rocker arm $27_A$; a first free rocker arm 28 adjoining the first driving rocker arm $27_A$ on the opposite side from the second driving rocker arm $27_B$; and a second free rocker arm 100 adjoining the second driving rocker arm $27_B$ on the opposite side from the first driving rocker arm $27_A$. A cam shaft 30" is integrally provided with a pair of rest portions 32, 32 which are in sliding contact with the first and second driving rocker arms $27_A$ and $27_B$, respectively, a first operating cam 34 which is in sliding contact with the first free rocker arm 28, and a second operating cam 101 which is in sliding contact with the second free rocker arm 100.

A connection switchover means $40_{1A}$ is provided between the first driving rocker arm $27_A$ and the first free rocker arm 28 and is capable of switching the connection and disconnection of the rocker arms $27_A$ and 28 to and from each other. A connection switchover means $40_{1B}$ is provided between the second driving rocker arm $27_B$ and the second free rocker arm 100 and is capable of switching the connection and disconnection of the rocker arms $27_B$ and 100 to and from each other. A connection switchover means $40_{1C}$ is provided between both the driving rocker arms $27_A$ and $27_B$ and is capable of switching the connection and disconnection of the rocker arms $27_A$ and $27_B$ to and from each other. Each of the connection switchover means $40_{1A}$, $40_{1B}$ and $40_{1C}$ has basically the same construction as the valve operation/stoppage switchover means $40_1$ in the first embodiment and is switchable between a connecting state provided upon releasing of a hydraulic pressure and a disconnecting state provided upon application of the hydraulic pressure. Moreover, the rocker arm shaft 26" is independently provided with an oil passage $49_A$ connected to the connection switchover means $40_{1A}$, an oil passage $49_B$ connected to the connection switchover means $40_{1B}$, and an oil passage $49_C$ connected to the connection switchover means $40_{1C}$. The connection switchover means $40_{1A}$, $40_{1B}$ and $40_{1C}$ can be independently operated for switching.

The fifth embodiment enables the following conditions to be switched from one to the other: a cylinder-stopped condition in which all the connection switchover means $40_{1A}$, $40_{1B}$ and $40_{1C}$ are brought into the disconnecting states to stop both of the intake valve $V_I$, $V_I$; a condition in which the connection switchover means $40_{1B}$ is brought into the connecting state, while the connection switchover means $40_{1A}$ and $40_{1C}$ are brought into the disconnecting states, thereby stopping one of the intake valve $V_I$ and opening and closing the other intake valve $V_I$ by the second operating cam 101; a condition in which the connection switchover means $40_{1A}$ and $40_{1B}$ are brought into the connecting states, while the connection switchover means $40_{1C}$ is brought into the disconnecting state, thereby opening and closing the one intake valve $V_I$ by the first operating cam 34 and opening and closing the other intake valve $V_I$ by the second operating cam 101; and a condition in which all the connection switchover means $40_{1A}$, $40_{1B}$ and $40_{1C}$ are brought into the connecting states to open and close both the intake valves $V_I$, $V_I$ by the first operating cam 34. Thus, it is possible to achieve a more subdivided valve-operation control.

Figure 19:
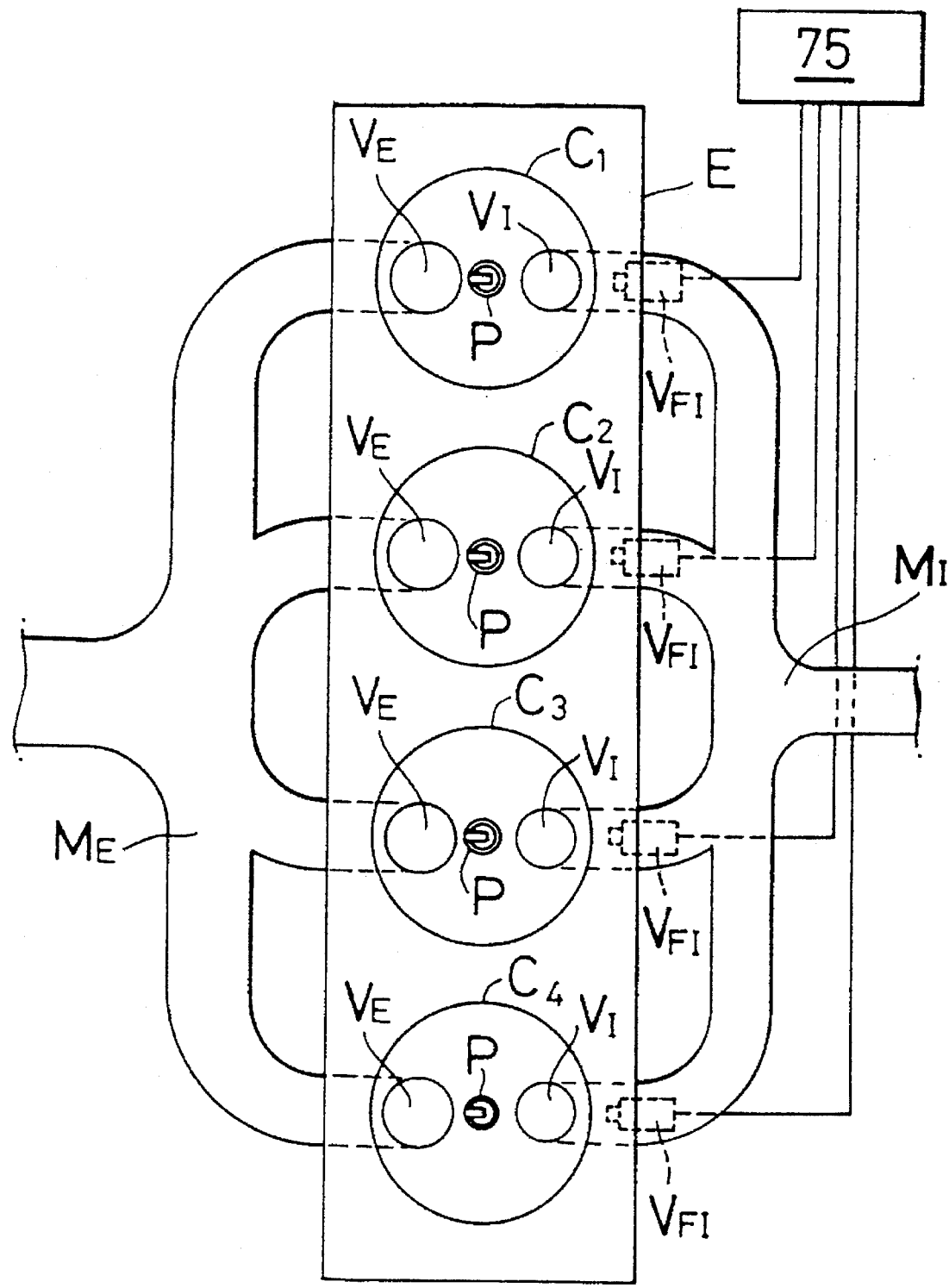
FIG. 19 is a plan view similar to FIG. 1, but illustrating a sixth embodiment.

FIG. 19 illustrates a sixth embodiment of the present invention. In the sixth embodiment, fuel injection valves $V_{FI}$ are provided in an intake manifold $M_I$ in independent correspondence to each of the cylinders $C_1$, $C_2$, $C_3$ and $C_4$ as combustion governing means for governing the execution and stoppage of the combustion in the cylinders $C_1$, $C_2$, $C_3$ and $C_4$. The operation of the fuel injection valves $V_{FI}$ is controlled by a control unit 75. The control unit 75 controls the operation and stoppage of the fuel injection valves $V_{FI}$ in such a switching manner that the operation and stoppage of the cylinders $C_1$, $C_2$, $C_3$ and $C_4$ are repeated according to a predetermined cylinder stoppage cycle, when the engine is in the cylinder operation-stopped operational state. Moreover, a plurality of control modes with different cylinder stoppage cycles are previously established, and the fuel injection valves $V_{FI}$ are controlled by the control mode selected in accordance with the operational state of the engine.

Figure 20:
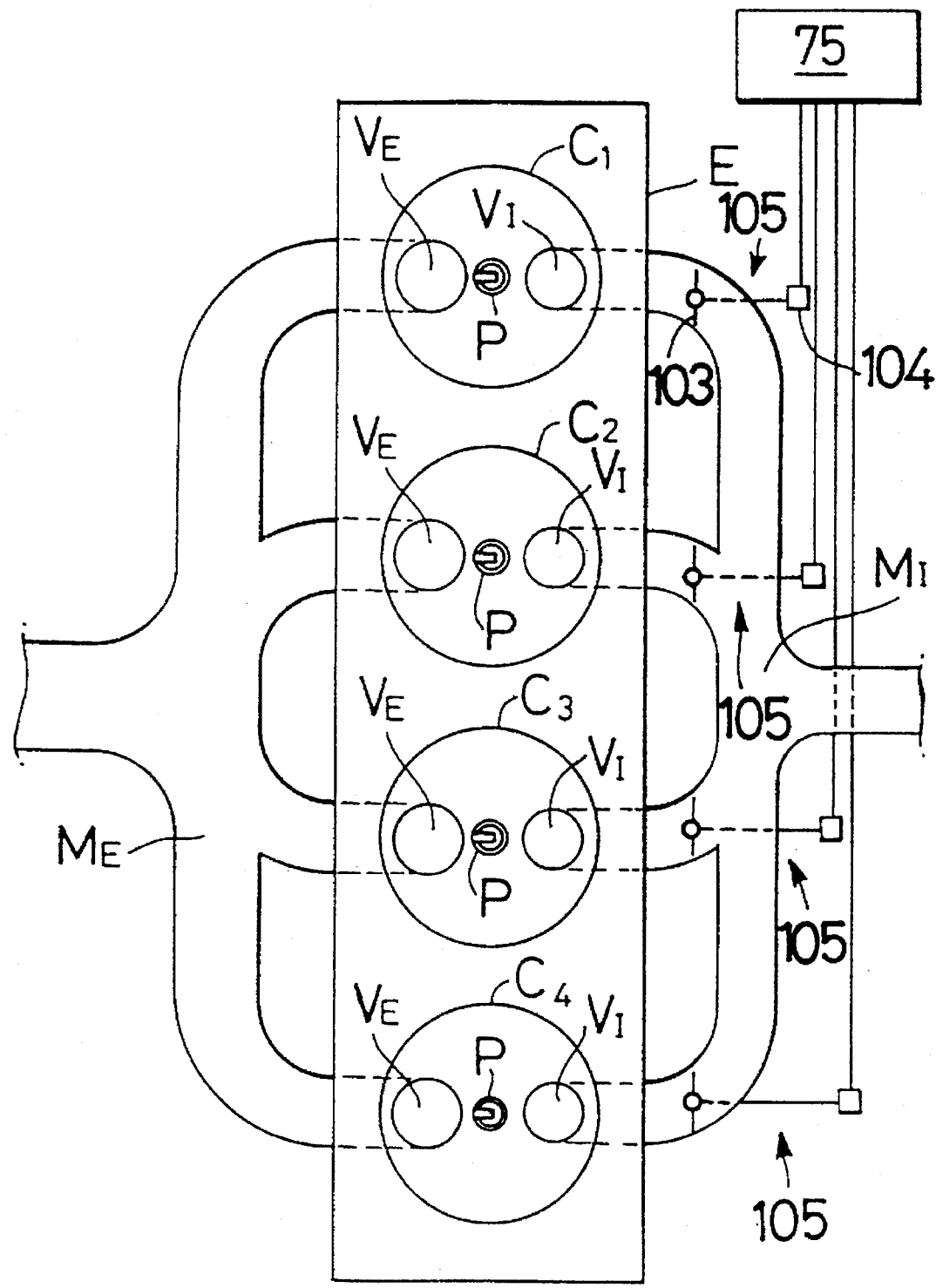
FIG. 20 is a plan view similar to FIG. 1, but illustrating a seventh embodiment.

FIG. 20 illustrates a seventh embodiment of the present invention. In the seventh embodiment, cut-off valves 103 are provided in an intake manifold $M_I$ in independent correspondence to each of the cylinders $C_1$, $C_2$, $C_3$ and $C_4$ and are capable of cutting off the supplying of an air-fuel mixture to the cylinders $C_1$, $C_2$, $C_3$ and $C_4$. Actuators 104 are connected to cut-off valves 103, respectively. The cut-off valve 103 and the actuator 104 constitute a combustion governing means 105 for governing the execution and stoppage of the combustion in each of the cylinders $C_1$, $C_2$, $C_3$ and $C_4$. The operation of the combustion governing means 105 is controlled by a control unit 75. Thus, the control unit 75 controls the operation and stoppage of the combustion governing means 105 for every cylinder in such a switching manner that the operation and stoppage of all the cylinders are repeated according to a predetermined cylinder stoppage cycle, when the engine is in the cylinder operation-stopped operational state. Any of a plurality of control modes with different cylinder stoppage cycles can be selected in accordance with the operational state of the engine.

In a further alternate embodiment of the present invention, the ignition and stoppage of spark plugs P as combustion governing means for governing the combustion in the cylinders $C_1$, $C_2$, $C_3$ and $C_4$ may be controlled by the control unit 75.

Although the 4-cylinder internal combustion engine has been described in the embodiments, the present invention is applicable to a 5-cylinder internal combustion engine. In an internal combustion engine including five cylinders $C_1$, $C_2$, $C_3$, $C_4$ and $C_5$, a plurality of control modes, for example, as shown in Table 5, are established and any one of the control modes is selected in accordance with the operational state of the engine.

TABLE 5

| Control mode | All cylinders first cycle | | | | | All cylinders second cycle | | | | | All cylinders third cycle | | | | | All cylinders fourth cycle | | | | |
|---|---|---|---|---|---|---|---|---|---|---|---|---|---|---|---|---|---|---|---|---|
| | $C_1$ | $C_2$ | $C_4$ | $C_5$ | $C_3$ | $C_1$ | $C_2$ | $C_4$ | $C_5$ | $C_3$ | $C_1$ | $C_2$ | $C_4$ | $C_5$ | $C_3$ | $C_1$ | $C_2$ | $C_4$ | $C_5$ | $C_3$ |
| First mode | O | X | X | X | O | X | X | X | O | X | X | X | O | X | X | X | O | X | X | X |
| Second mode | O | X | X | O | X | X | O | X | O | X | X | O | X | O | X | X | O | X | O | X |
| Third mode | O | X | O | X | O | X | O | X | O | X | O | X | O | X | O | X | O | X | O | X |

In Table 5, the explosion chance is ¼ in the first mode, ⅓ in the second mode, and ½ in the third mode.

The present invention is also applicable to a 6-cylinder internal combustion engine. In an internal combustion engine including six cylinders $C_1$, $C_2$, $C_3$, $C_4$, $C_5$ and $C_6$, a plurality of control modes, for example, as shown in Table 6, are established and any one of the control modes is selected in accordance with the operational state of the engine.

TABLE 6

| Control mode | All cylinders first cycle | | | | | | All cylinders second cycle | | | | | | All cylinders third cycle | | | | | | All cylinders fourth cycle | | | | | | All cylinders fifth cycle | | | | | |
|---|---|---|---|---|---|---|---|---|---|---|---|---|---|---|---|---|---|---|---|---|---|---|---|---|---|---|---|---|---|---|---|
| | $C_1$ | $C_4$ | $C_2$ | $C_5$ | $C_3$ | $C_6$ | $C_1$ | $C_4$ | $C_2$ | $C_5$ | $C_3$ | $C_6$ | $C_1$ | $C_4$ | $C_2$ | $C_5$ | $C_3$ | $C_6$ | $C_1$ | $C_4$ | $C_2$ | $C_5$ | $C_3$ | $C_6$ | $C_1$ | $C_4$ | $C_2$ | $C_5$ | $C_3$ | $C_6$ |
| First mode | O | O | X | X | O | O | X | X | O | O | X | X | O | O | X | X | O | O | X | X | O | O | X | X | O | O | X | X | O | O |
| Second mode | O | X | X | X | X | O | X | X | X | X | O | X | X | X | X | O | X | X | X | X | O | X | X | X | X | O | X | X | X | X |
| Third mode | O | X | X | X | O | X | X | X | O | X | X | X | O | X | X | X | O | X | X | X | O | X | X | X | O | X | X | X | O | X |
| Fourth mode | O | X | X | X | O | X | X | X | O | X | X | X | O | X | X | X | O | X | X | X | O | X | X | X | O | X | X | X | O | X |

In Table 6, the explosion chance is ½ in the first mode, ⅕ in the second mode, ¼ in the third mode, and ⅓ in the fourth mode. The ignition intervals are equal in the first and second modes, while the ignition intervals are unequal in the third and fourth modes.

Although the embodiments of the present invention have been described in detail, it will be understood that the present invention is not limited to the above-described embodiments, and various modifications in design may be made without departing from the spirit and scope of the invention defined in claims.

For example, the present invention is applicable not only to 4-cycle internal combustion engine, but also to a 2-cycle internal combustion engine, and also to an internal combustion engine designed so that the stoppage of cylinders is performed by closing and stopping only intake valves $V_I$ of intake and exhaust valves $V_I$ and $V_E$.

What is claimed is:

1. A variable cylinder-operation controlled internal combustion engine comprising an engine valve disposed in each of a plurality of cylinders, respectively, such that the operation of each of the plurality of cylinders is stopped by stopping the operation of the engine valve disposed in such cylinder, wherein said internal combustion engine further includes valve operation and stoppage switchover means provided for said respective cylinders and capable of switching over the operation and stoppage of said engine valves independently from each other, and a control unit for controlling the operation of said valve operation and stoppage switchover means in a cylinder operation-stopped operational state to cause said engine valve in each said cylinder to repeatedly assume operating and stopped states according to a previously established engine valve operation and stoppage control mode in an operating and stopped order different from an operating and stopped order of said engine valve of at least one other said cylinder when said engine is in said cylinder operation-stopped operational state, and wherein said engine valve operation and stoppage mode established by said control unit includes an engine valve operating and stopped order in which a frequency of stoppage of each said engine valve for every set number of rotations of an engine crankshaft is differentiated among said plurality of cylinders.

2. A variable cylinder-operation controlled internal combustion engine according to claim 1, wherein a plurality of said control modes with different engine valve operating and stopped orders are established, and said control unit is capable of selecting any of the control modes in accordance with the operational state of the engine.

3. A variable cylinder-operation controlled internal combustion engine according to claim 1, wherein said engine includes a camshaft rotatably driven by said crankshaft, and said valve operation and stoppage means being operationally provided between said camshaft and said engine valves for selectively causing operation of said engine valves in response to rotation of said camshaft.

4. A variable cylinder-operation controlled internal combustion engine according to claim 1 wherein said valve operation and stoppage switchover means for each of said cylinders is arranged such that the operation and stoppage of said engine valve is switched by a fluid pressure, and wherein said engine further includes a solenoid fluid pressure control valve means disposed for each of groups of said cylinders and controlled by said control means, and a mechanically-operated valve which is provided between each of said solenoid fluid pressure control valve means and each of the valve operation and stoppage switchover means for determining a timing of supply of working fluid to each of said valve operation and stoppage switchover means by a mechanical operation related to the rotating operation of an engine crankshaft.

5. A variable cylinder-operation controlled internal combustion engine according to claim 1, wherein a plurality of control modes are established such that engine valve operating and stopped orders for said cylinders are different from one another, frequencies of stoppage of the engine valves in said cylinders for every set number of rotations of a crankshaft of said engine are made uniform between the cylinders, and said control unit is capable of selecting any of said control modes in accordance with the operational state of said engine.

6. A variable cylinder-operation controlled internal combustion engine according to claim 1, wherein said valve operation and stoppage switchover means for each of the cylinders is arranged such that the operation and stoppage of the engine valve is switched by a fluid pressure, and said engine further includes solenoid fluid pressure control valve means which are independently connected to said valve operation and stoppage switchover means for said cylinders, respectively, and controlled by said control unit.

7. A variable cylinder-operation controlled internal combustion engine comprising an engine valve disposed in each of a plurality of cylinders, respectively, such that the operation of each of the plurality of cylinders is stopped by stopping the operation of the engine valve disposed in such cylinder, wherein said internal combustion engine further includes valve operation and stoppage switchover means provided for said respective cylinders and capable of switching over the operation and stoppage of said engine valves independently from each other, and a control unit for controlling the operation of said valve operation and stoppage switchover means in a cylinder operation-stopped operational state to cause a predetermined engine valve operating and stopped order for said engine valve in each said cylinder when said engine is in a cylinder operation-stopped operational state; and wherein said engine valve operating and stopped order is set for each of said cylinders and is established such that phases of said engine valve operating and stoppage orders for each of the cylinders causes a frequency of stoppage of each said engine valve for every set number of rotations of an engine crankshaft to be differentiated among said plurality of cylinders.

8. A variable cylinder-operation controlled internal combustion engine according to claim 7, wherein said engine includes a camshaft rotatably driven by said crankshaft, and said valve operation and stoppage means being operationally provided between said camshaft and said engine valves for selectively causing operation of said engine valves in response to rotation of said camshaft.

9. A variable cylinder-operation controlled internal combustion engine comprising combustion governing means disposed for each of a plurality of cylinders to govern execution and stoppage of fuel combustion, such that an operation of each of said cylinders is stopped by a stopping operation of the combustion governing means, wherein said internal combustion engine further includes a control unit for controlling a switchover between a normal operation and stopping operation of said combustion governing means for each of the cylinders such that the operation and stoppage of each said cylinder is repeated according to a previously established cylinder operation and stoppage order different from a cylinder operation and stoppage order of at least one other said cylinder when said engine is in a cylinder-operation-stopped operational state, said control unit being capable of selecting any of a plurality of control modes each having a different cylinder operation and stoppage order in accordance with the operational state of said engine, and each said control mode including a frequency of said stopping operation of each said cylinder for every set number of rotations of an engine crankshaft that is differentiated among said plurality of cylinders.

10. A variable cylinder-operation controlled internal combustion engine comprising at least one intake engine valve disposed in each of a plurality of cylinders, a valve operation and stoppage switchover means provided for each of said cylinders and being capable of switching over the operation and stoppage of said intake engine valve in said cylinders independently from each other to stop the operation of that cylinder, and a control unit for controlling the operation of each said valve operation and stoppage switchover means to cause each of said cylinders to be operated periodically and stopped periodically with each of said cylinders being operated during different rotational cycles of a crankshaft of the engine and being stopped during different rotational cycles of said crankshaft when the engine is in a cylinder operation-stopped operational state, wherein a frequency of said stoppage of operation of each said intake engine valve for every set number of rotations of an engine crankshaft is differentiated among said plurality of cylinders.

11. A variable cylinder-operation controlled internal combustion engine according to claim 9, wherein said combustion governing means includes an intake engine valve in each said cylinder and valve operating means for selectively operating or stopping operation of each said intake engine valve, said engine including a camshaft rotatably driven by said crankshaft, and said valve operating means being operationally provided between said camshaft and each said intake engine valve for selectively causing operation of each said engine valve by and in response to rotation of said camshaft.

12. A variable cylinder-operation controlled internal combustion engine according to claim 10, wherein said control unit includes means for causing a plurality of different control modes for causing said cylinders to be periodically operated and stopped in different orders.

13. A variable cylinder-operation controlled internal combustion engine according to claim 12, wherein said control unit includes means for selecting each said control mode based on an operational state of the engine.

14. A variable cylinder-operation controlled internal combustion engine according to claim 10, wherein said engine includes a camshaft rotatably driven by said crankshaft, and said valve operation and stoppage means being operationally provided between said camshaft and said engine valves for selectively causing operation of said engine valves in response to rotation of said camshaft.

* * * * *